United States Patent
Asai et al.

(10) Patent No.: US 10,907,559 B2
(45) Date of Patent: Feb. 2, 2021

(54) CONTROL DEVICE FOR INTERNAL COMBUSTION ENGINE AND CONTROL METHOD FOR INTERNAL COMBUSTION ENGINE

(71) Applicant: Yanmar Co., Ltd., Osaka (JP)

(72) Inventors: Go Asai, Osaka (JP); Hideyuki Ogawa, Sapporo (JP); Gen Shibata, Sapporo (JP); Kenji Yamazaki, Sapporo (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 3 days.

(21) Appl. No.: 16/316,498

(22) PCT Filed: Jun. 29, 2017

(86) PCT No.: PCT/JP2017/024051
§ 371 (c)(1),
(2) Date: Jan. 9, 2019

(87) PCT Pub. No.: WO2018/012311
PCT Pub. Date: Jan. 18, 2018

(65) Prior Publication Data
US 2019/0301382 A1     Oct. 3, 2019

(30) Foreign Application Priority Data
Jul. 14, 2016 (JP) .................... 2016-139573

(51) Int. Cl.
*F02D 41/00*      (2006.01)
*F02D 19/06*      (2006.01)
(Continued)

(52) U.S. Cl.
CPC .......... *F02D 41/0052* (2013.01); *F02B 51/00* (2013.01); *F02B 75/18* (2013.01);
(Continued)

(58) Field of Classification Search
CPC .............. F02D 41/0047; F02D 41/005; F02D 41/0052; F02D 41/0055; F02D 41/0057;
(Continued)

(56) References Cited

U.S. PATENT DOCUMENTS 6,131,388 A * 10/2000 Sasaki ................. F02D 41/0057
                                                            60/276
7,059,277 B2 * 6/2006 Matsuoka ............. F02M 25/12
                                                            123/3
(Continued)

FOREIGN PATENT DOCUMENTS

DE   102012204649 A1 * 9/2013 ............. F02M 26/36
EP   2947299 A1      11/2015
(Continued)

OTHER PUBLICATIONS

English machine translation of DE-102012204649-A1 provided by ESPACENET (Year: 2020).*

(Continued)

*Primary Examiner* — Jacob M Amick
*Assistant Examiner* — Michael A Kessler
(74) *Attorney, Agent, or Firm* — Norton Rose Fulbright US LLP

(57) ABSTRACT

A control device to be applied to an internal combustion engine having a fuel reformation cylinder and an output cylinder, wherein the compression end gas temperature of the fuel reformation cylinder is adjusted by changing an EGR gas amount, an effective compression ratio, or a polytropic number according to an equivalence ratio in the (Continued)

fuel reformation cylinder so as to achieve a target concentration of a specific gas component in reformed fuel generated in the fuel reformation cylinder. The target concentration is defined according to a required engine power.

20 Claims, 11 Drawing Sheets

(51) Int. Cl.
    *F02B 51/00*     (2006.01)
    *F02M 26/36*     (2016.01)
    *F02D 41/30*     (2006.01)
    *F02M 27/02*     (2006.01)
    *F02D 45/00*     (2006.01)
    *F02B 75/18*     (2006.01)
    *F02M 26/05*     (2016.01)
    *F02D 41/02*     (2006.01)

(52) U.S. Cl.
    CPC ..... *F02D 19/0671* (2013.01); *F02D 41/0025* (2013.01); *F02D 41/30* (2013.01); *F02D 45/00* (2013.01); *F02M 26/36* (2016.02); *F02M 27/02* (2013.01); *F02D 41/0245* (2013.01); *F02D 2041/007* (2013.01); *F02D 2041/0265* (2013.01); *F02M 26/05* (2016.02)

(58) Field of Classification Search
    CPC ............. F02D 41/0065; F02D 41/0067; F02D 41/025; F02D 19/0671; F02D 19/087; F02D 2041/007; F02M 26/36; F02M 27/02
    USPC .............................................. 123/3; 701/108
    See application file for complete search history.

(56) References Cited

U.S. PATENT DOCUMENTS

| | | | |
|---|---|---|---|
| 2004/0099226 A1* | 5/2004 | Bromberg | B01J 19/0006 123/3 |
| 2004/0144337 A1 | 7/2004 | Wakao et al. | |
| 2006/0169246 A1* | 8/2006 | Asai | F01L 13/0042 123/305 |
| 2009/0308070 A1* | 12/2009 | Alger, II | F02D 13/0238 60/602 |
| 2010/0300382 A1* | 12/2010 | Yahagi | C01B 3/323 123/3 |
| 2013/0061575 A1* | 3/2013 | Korenaga | F02D 41/0065 60/278 |
| 2015/0369178 A1* | 12/2015 | Asai | F02D 41/0025 123/3 |

FOREIGN PATENT DOCUMENTS

| | | | |
|---|---|---|---|
| JP | 2006052662 A | * | 2/2006 |
| JP | 2007-332891 A | | 12/2007 |
| JP | 2013007336 A | * | 1/2013 |
| JP | 2014-136978 A | | 7/2014 |
| JP | 2016-094930 A | | 5/2016 |
| JP | 2016-166611 A | | 9/2016 |

OTHER PUBLICATIONS

International Search Report dated Sep. 12, 2017 issued in corresponding PCT Application PCT/JP2017/024051.
European Search Report dated May 7, 2019 issued in corresponding EP Application 17827441.1.

* cited by examiner

CONTROL DEVICE FOR INTERNAL COMBUSTION ENGINE AND CONTROL METHOD FOR INTERNAL COMBUSTION ENGINE

CROSS REFERENCES TO RELATED APPLICATIONS

This application is a national stage application pursuant to 35 U.S.C. § 371 of International Application No. PCT/JP2017/024051, filed on Jun. 29, 2017 which claims priority under 35 U.S.C. § 119 to Japanese Patent Application No. 2016-139573 filed on Jul. 14, 2016, the disclosures of which are hereby incorporated by reference in their entireties.

TECHNICAL FIELD

The present invention relates to a control device for an internal combustion engine and a control method of an internal combustion engine. In particular, the present invention relates to a control device and a control method applied to an internal combustion engine including a fuel reformation cylinder capable of functioning as a fuel reformation device.

BACKGROUND ART

Traditionally, there has been known an internal combustion engine having a fuel reformation cylinder and an output cylinder (e.g., Patent Literature 1, hereinafter, PTL 1). This type of internal combustion engine reforms fuel in a fuel reformation cylinder. Then, the fuel after reformation (hereinafter, reformed fuel) is combusted in the output cylinder to obtain an engine power.

Specifically, a fuel such as light oil or heavy oil is supplied to the fuel reformation cylinder, and an air-fuel mixture having a high equivalence ratio is adiabatically compressed within the fuel reformation cylinder. As a result, the fuel is reformed under a high temperature and high pressure environment, and a reformed fuel (fuel with a high octane value) having a high anti-knock property such as hydrogen, carbon monoxide, and methane is generated. This reformed fuel is then supplied to the output cylinder together with the air, and the lean mixture is combusted (uniform lean combustion) in the output cylinder, to yield an engine power.

With this type of internal combustion engine, uniform lean combustion is performed in the output cylinder. The NOx emission amount and the soot discharge amount can therefore be reduced. Further, since a fuel with a high anti-knock property is combusted, knocking is suppressed or reduced, and since diesel micro-pilot ignition (ignition of reformed fuel by supplying a small amount of fuel into the output cylinder) enables combustion at a suitable timing, the combustion efficiency can be also improved.

CITATION LIST

Patent Literature

PTL 1: Japanese Patent Application Laid-Open No. 2014-136978

SUMMARY OF INVENTION

Technical Problem

PTL 1 discloses that the amount of fuel supplied to a fuel reformation cylinder is changed according to a required output (engine power required). For example, the amount of fuel to be supplied to the fuel reformation cylinder is increased with an increase in the required output.

The inventors of the present invention have newly found out that it is possible to respond to a change in the required output, by adjusting the concentration of each gas component in the reformed fuel (the gas composition of the reformed fuel). For example, they noted that, during a high-load operation, it is preferable to supply reformed fuel having a high anti-knock property to an output cylinder so as to avoid knocking. Further, during a low-load operation on the other hand, it is preferable to supply a reformed fuel having a relatively low anti-knock property to the output cylinder so as to achieve an ignition property. Examples of the reformed fuel having high anti-knock property include hydrogen, carbon monoxide, methane, and the like. On the other hand, examples of reformed fuel having a relatively low anti-knock property include ethane, propane, butane, and the like.

However, no specific proposal has been made to adjust the concentration of each gas component in the reformed fuel according to the required output.

Further, the inventors of the present invention have found that the equivalence ratio in the fuel reformation cylinder and the gas temperature in the fuel reformation cylinder during fuel reformation influence the concentration of each gas component in the reformed fuel. Further, they noted that the concentration of each gas component in the reformed fuel can be adjusted by using, as parameters, the equivalence ratio in the fuel reformation cylinder and the gas temperature in the fuel reformation cylinder at the time of fuel reformation.

The present invention is made in view of the above problems, and it is an object of the present invention to provide a control device and a control method for an internal combustion engine having a fuel reformation device and an output cylinder, the control device and the control method capable of adjusting the concentration of a gas component in the reformed fuel generated in the fuel reformation cylinder.

Solution to Problem

A solution of the present invention to achieve the above-described object premises a control device to be applied to an internal combustion engine including a fuel reformation cylinder capable of serving as a fuel reformation device and an output cylinder to which reformed fuel generated in the fuel reforming cylinder is supplied, the output cylinder configured to yield an engine power by combusting the reformed fuel. The control device of the internal combustion engine includes a gas temperature adjustment unit configured to adjust a gas temperature in the fuel reformation cylinder at a time of fuel reformation according to an equivalence ratio in the fuel reformation cylinder so that a concentration of a specific gas component in the reformed fuel generated in the fuel reformation cylinder is a target concentration defined according to a required engine power.

In this solution, the target concentration of the specific gas component in the reformed fuel generated in the fuel reformation cylinder is defined according to the required engine power. The gas temperature adjustment unit adjusts the gas temperature in the fuel reformation cylinder at the time of fuel reformation according to an equivalence ratio in the fuel reformation cylinder so as to achieve the target concentration of this specific gas component. In other words, the gas temperature in the fuel reformation cylinder at the time of fuel reformation is adjusted according to the equivalence ratio in the fuel reformation cylinder so as to achieve the target concentration of the specific gas component. This way, the output obtained by combustion of the reformed fuel in the output cylinder can be adjusted to the required engine power, without a significant change in the amount of fuel supplied to the fuel reformation cylinder.

Further, the fuel reformation cylinder is preferably structured as a reciprocation type in which a piston reciprocates in the cylinder, and the gas temperature adjustment unit preferably adjusts the gas temperature in the fuel reformation cylinder at a timing of the piston reaching a compression top dead point in the fuel reformation cylinder, according to an equivalence ratio in the fuel reformation cylinder.

By configuring the gas temperature adjustment unit to adjust the gas temperature in the fuel reformation cylinder at the timing of the piston reaching a compression top dead point in the fuel reformation cylinder, according to the equivalence ratio in the fuel reformation cylinder, the gas temperature adjustment unit can specifically specify the timing for adjusting the gas temperature. This way, adjustment control of the gas temperature can be simplified.

Further, the gas temperature adjustment unit is preferably configured to set the gas temperature in the fuel reformation cylinder at the time of fuel reformation so that the gas temperature is higher for a higher target concentration of hydrogen or carbon monoxide as the gas component in the reformed fuel generated in the fuel reformation cylinder.

By setting a higher gas temperature in the fuel reformation cylinder at the time of fuel reformation, reformed fuel with particularly high anti-knock property such as hydrogen or carbon monoxide can be effectively generated. Thus, for example, knocking during a high-load operation of the internal combustion engine can be avoided.

Further, it is preferable to include a gas temperature estimation unit configured to estimate the gas temperature in the fuel reformation cylinder at a the timing of the piston reaching a compression top dead point, and it is preferable that the gas temperature adjustment unit is configured to adjust the gas temperature according to a deviation between the gas temperature estimated by the gas temperature estimation unit and the gas temperature that achieves the target concentration of the specific gas component in the reformed fuel generated in the fuel reformation cylinder.

With this temperature adjustment, the gas temperature in the fuel reformation cylinder at the timing of the piston reaching the compression top dead point can be adjusted to the gas temperature that achieves the target concentration of the specific gas component in the reformed fuel. Thus, the concentration of the specific gas component can be set to the target concentration.

Further, the gas temperature adjustment unit is preferably configured to adjust the gas temperature in the fuel reformation cylinder at the time of fuel reformation, by adjusting the temperature of the taken-in gas introduced to the fuel reformation cylinder.

Further, the gas temperature adjustment unit may be configured to adjust the gas temperature in the fuel reformation cylinder at the time of fuel reformation, by adjusting effective compression ratio of the fuel reformation cylinder.

Further, the gas temperature adjustment unit may be configured to adjust the gas temperature in the fuel reformation cylinder at the time of fuel reformation, by adjusting the concentration of oxygen in the taken-in gas introduced to the fuel reformation cylinder.

As described above, the gas temperature in the fuel reformation cylinder at the time of fuel reformation can be adjusted by adjusting any of: the temperature of the taken-in gas introduced to the fuel reformation cylinder; the effective compression ratio of the fuel reformation cylinder; and the oxygen concentration of the taken-in gas introduced to the fuel reformation cylinder (the oxygen concentration that defines the amount of partial oxidation reaction in the reforming reaction). By adjusting the gas temperature in the fuel reformation cylinder, the concentration of the specific gas component can be set to the target concentration.

Further, a lower limit value of the temperature in the fuel reformation cylinder is preferably set according to the equivalence ratio in the fuel reformation cylinder, and the lower limit value of the temperature in the fuel reformation cylinder is higher for a higher equivalence ratio in the fuel reformation cylinder.

To enable reforming reaction in the fuel reformation cylinder, the gas temperature in the fuel reformation cylinder needs to be set higher with an increase in the equivalence ratio of the air-fuel mixture in the fuel reformation cylinder. In the present solution, the lower limit value of the temperature in the fuel reformation cylinder is set higher for a higher equivalence ratio in the fuel reformation cylinder. Therefore, a state where the reforming reaction is disabled can be avoided, and the reforming reaction can be effectively performed.

Further, the scope of the technical thought of the present invention encompasses a control method for the internal combustion engine implemented by the control device for the internal combustion engine according to each of the above described solutions. Namely, it is premised that a control method is applied to an internal combustion engine includes a fuel reformation cylinder capable of serving as a fuel reformation device and an output cylinder to which reformed fuel generated in the fuel reforming cylinder is supplied, the output cylinder configured to yield an engine power by combusting the reformed fuel. In the control method for the internal combustion engine, a gas temperature in the fuel reformation cylinder at a time of fuel reformation is adjusted according to an equivalence ratio in the fuel reformation cylinder so that a concentration of a specific gas component in the reformed fuel generated in the fuel reformation cylinder is a target concentration defined according to a required engine power.

With this control method, the output obtained by combustion of the reformed fuel in the output cylinder can be adjusted to the required engine power, without a significant change in the amount of fuel supplied to the fuel reformation cylinder, as hereinabove described.

Advantageous Effects of Invention

In the present invention, a gas temperature in the fuel reformation cylinder at a time of fuel reformation is adjusted according to an equivalence ratio in the fuel reformation cylinder so that a concentration of a specific gas component in the reformed fuel generated in the fuel reformation cylinder is a target concentration defined according to a required engine power. Therefore, the output obtained by combustion of the reformed fuel in the output cylinder can be adjusted to the required engine power, without a significant change in the amount of fuel supplied to the fuel reformation cylinder.

DESCRIPTION OF EMBODIMENTS

The following describes an embodiment of the present invention based on the attached drawings. The present embodiment deals with a case where the present invention is applied to an internal combustion engine for a ship.

—System Structure of Internal Combustion Engine—

Figure 1:
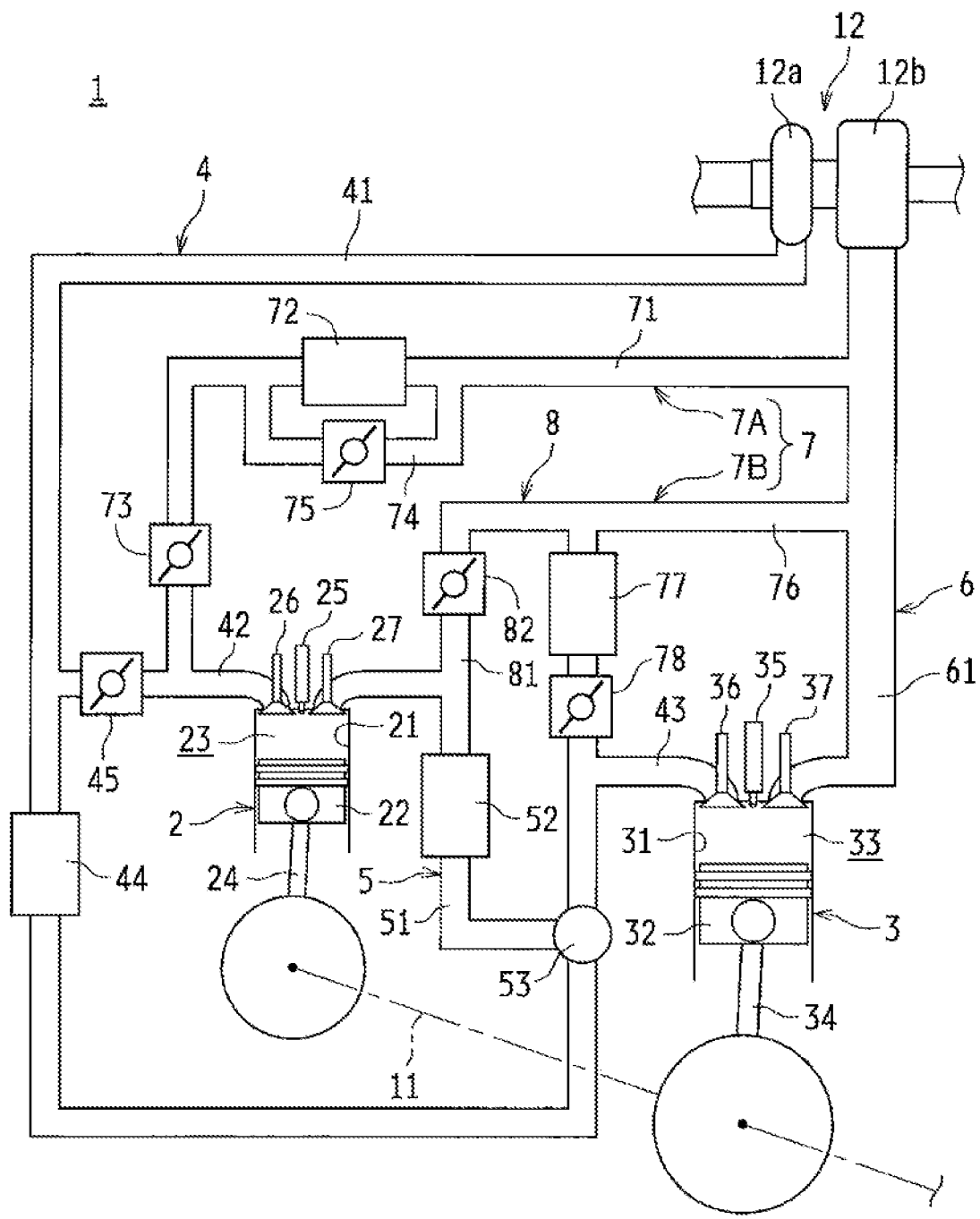
FIG. 1 A diagram showing a system structure of an internal combustion engine related to an embodiment.

FIG. 1 is a diagram showing a system structure of an internal combustion engine related to the present embodiment.

As shown in FIG. 1, the internal combustion engine 1 according to the present embodiment includes a fuel reformation cylinder 2 and an output cylinder 3. Further, the internal combustion engine 1 includes, as a piping system for supplying (introducing) gas or discharging (leading out) a gas to and from the fuel reformation cylinder 2 and the output cylinder 3, an air-intake system 4, a reformed fuel supply system 5, an exhaust system 6, an EGR system 7, and an output cylinder bypass system 8.

(Fuel Reformation Cylinder and Output Cylinder)

The fuel reformation cylinder 2 and the output cylinder 3 are both structured as a reciprocation type. Specifically, the cylinders 2, 3 have, in their cylinder bores 21, 31 formed in a cylinder block (not shown), pistons 22, 32 in such a manner as to be able to reciprocate, respectively. In the fuel reformation cylinder 2, a fuel reformation chamber 23 is formed by the cylinder bore 21, the piston 22, and a not-shown cylinder head. In the output cylinder 3, a combustion chamber 33 is formed by the cylinder bore 31, the piston 32, and a not-shown cylinder head.

The internal combustion engine 1 of the present embodiment includes four cylinders in the cylinder block, and one of the cylinders is structured as the fuel reformation cylinder 2, whereas three other cylinders are structured as the output cylinder 3. Reformed fuel generated by the fuel reformation cylinder 2 is supplied to each output cylinder 3. The numbers of the cylinders 2, 3 are not limited to the above. For example, the cylinder block may include six cylinders, and two of the cylinders are structured as the fuel reformation cylinder 2, whereas four other cylinders are structured as the output cylinder 3.

The pistons 22, 32 of the cylinders 2, 3 are connected to a crankshaft 11 through connecting rods 24, 34, respectively. This way, the motion is converted from reciprocation of the pistons 22, 32 to rotation of the crankshaft 11. The crankshaft 11 can be connected to a screw shaft of the ship through a clutch mechanism (not shown). The piston 22 of the fuel reformation cylinder 2 and the piston 32 of the output cylinder 3 are connected to each other through the connecting rods 24, 34 and the crankshaft 11. This enables power transmission between the cylinders 2, 3, transmission of output power from the cylinders 2, 3 to the screw shaft, and the like.

The fuel reformation cylinder 2 includes an injector 25 configured to supply a pre-reformed fuel such as light oil to the fuel reformation chamber 23. With supply of fuel from the injector 25, the fuel reformation chamber 23 adiabatically compresses air-fuel mixture with a high equivalence ratio. As a result, the fuel is reformed under a high temperature and high pressure environment, and a reformed fuel having a high anti-knock property such as hydrogen, carbon monoxide, and methane is generated.

The output cylinder 3 includes an injector 35 configured to supply a fuel such as light oil to the combustion chamber 33. To the combustion chamber 33, the reformed fuel generated in the fuel reformation cylinder 2 is supplied together with the air. In this combustion chamber 33, a premixed compression self-ignition combustion of a lean mixture or propagation flame combustion using a small amount of fuel injected from the injector 35 as an ignition source is performed. This way, the crankshaft 11 rotates with reciprocation of the piston 32, and an engine power is obtained.

(Air-Intake System)

The air-intake system 4 is configured to introduce air (fresh air) to the fuel reformation chamber 23 of the fuel reformation cylinder 2 and the combustion chamber 33 of the output cylinder 3.

The air-intake system 4 includes a main air-intake passage 41. This main air-intake passage 41 is branched into two systems: i.e., a fuel reformation cylinder air-intake passage 42 and an output cylinder air-intake passage 43. The main air-intake passage 41 includes a compressor wheel 12a of a turbocharger 12. The fuel reformation cylinder air-intake passage 42 communicates with the air-intake port of the fuel reformation cylinder 2. Between this air-intake port and the fuel reformation chamber 23 of the fuel reformation cylinder 2, an air-intake valve 26 that can open/close is arranged. Further, the fuel reformation cylinder air-intake passage 42 includes an air-intake amount adjust valve 45 whose opening degree is adjustable. The output cylinder air-intake passage 43 communicates with an air-intake port of the output cylinder 3. Between this air-intake port and the combustion chamber 33 of the output cylinder 3, an air-intake valve 36 that can open/close is arranged. Further, the output cylinder air-intake passage 43 includes an intake-air cooler (inter cooler) 44.

(Reformed Fuel Supply System)

The reformed fuel supply system 5 supplies reformed fuel generated in the fuel reformation cylinder 2 to the combustion chamber 33 of the output cylinder 3.

The reformed fuel supply system 5 includes a reformed fuel supply passage 51 The reformed fuel supply passage 51 includes a reformed fuel cooler 52. An upstream end of the reformed fuel supply passage 51 communicates with the exhaust port of the fuel reformation cylinder 2. Between this exhaust port and the fuel reformation chamber 23 of the fuel reformation cylinder 2, an exhaust valve 27 that can open/close is arranged. A downstream end of the reformed fuel supply passage 51 communicates with the output cylinder air-intake passage 43. In a communicating portion between the reformed fuel supply passage 51 and the output cylinder air-intake passage 43, a mixer 53 is provided. In the mixer 53, the reformed fuel generated by the fuel reformation cylinder 2 is mixed with the air flowing through the output cylinder air-intake passage 43, and is supplied to the combustion chamber 33 of the output cylinder 3.

(Exhaust System)

The exhaust system 6 is configured to discharge exhaust gas generated in the output cylinder 3. The exhaust system 6 includes an exhaust passage 61. The exhaust passage 61 includes a turbine wheel 12b of the turbocharger 12. The exhaust passage 61 communicates with an exhaust port of the output cylinder 3. Between this exhaust port and the combustion chamber 33 of the output cylinder 3, an exhaust valve 37 that can open/close is arranged.

(EGR System)

An EGR system 7 includes a fuel reformation cylinder EGR system 7A and an output cylinder EGR system 7B.

The fuel reformation cylinder EGR system 7A is configured to direct and supply a part of exhaust gas to the fuel reformation chamber 23 of the fuel reformation cylinder 2, the exhaust gas flowing through the exhaust passage 61. The fuel reformation cylinder EGR system 7A includes a fuel reformation cylinder EGR passage 71. The fuel reformation cylinder EGR passage 71 has its upstream end communicated with the exhaust passage 61, and has its downstream end communicated with the downstream side of the air-intake amount adjust valve 45 in the fuel reformation cylinder air-intake passage 42, respectively. The fuel reformation cylinder EGR passage 71 includes an EGR gas cooler 72. On the downstream side of the EGR gas cooler 72 in the fuel reformation cylinder EGR passage 71 (in a position closer to the fuel reformation cylinder air-intake passage 42), an EGR gas amount adjusting valve 73 is provided. Further, the fuel reformation cylinder EGR system 7A is provided with a cooler bypass passage 74 for letting the EGR gas bypassing the EGR gas cooler 72. In the cooler bypass passage 74, a bypass amount adjusting valve 75 is provided.

The output cylinder EGR system 7B is configured to return a part of exhaust gas to the combustion chamber 33 of the output cylinder 3, the exhaust gas flowing through the exhaust passage 61. The output cylinder EGR system 7B includes an output cylinder EGR passage 76.

The output cylinder EGR passage 76 has its upstream end communicated with the exhaust passage 61, and has its downstream end communicated with the downstream side of a mixer 53 in the output cylinder air-intake passage 43, respectively. The output cylinder EGR passage 76 includes an EGR gas cooler 77. On the downstream side of the EGR gas cooler 77 in the output cylinder EGR passage 76 (in a position closer to the output cylinder air-intake passage 43), an EGR gas amount adjusting valve 78 is provided.

(Output Cylinder Bypass System)

The output cylinder bypass system 8 is used to introduce exhaust gas from the fuel reformation cylinder 2 into the exhaust passage 61 without supplying the gas to the output cylinder 3 (i.e., by bypassing the output cylinder 3). The output cylinder bypass system 8 includes an output cylinder bypass passage 81. The output cylinder bypass passage 81 has its upstream end communicated with the upstream side of a reformed fuel cooler 52 in a reformed fuel supply passage 51, and has its downstream end communicated with the upstream side of the EGR gas cooler 77 (the side close to the exhaust passage 61) in the output cylinder EGR passage 76. Further, the output cylinder bypass passage 81 includes a bypass amount adjusting valve 82.

For the coolers 44, 52, 72, 77 provided in each of the above-described systems, engine cooling water, seawater, or the like is used as a cooling heat source for cooling the gas. Further, the coolers 44, 52, 72, 77 may be of an air-cooled type.

—Control System of Internal Combustion Engine—

Figure 2:
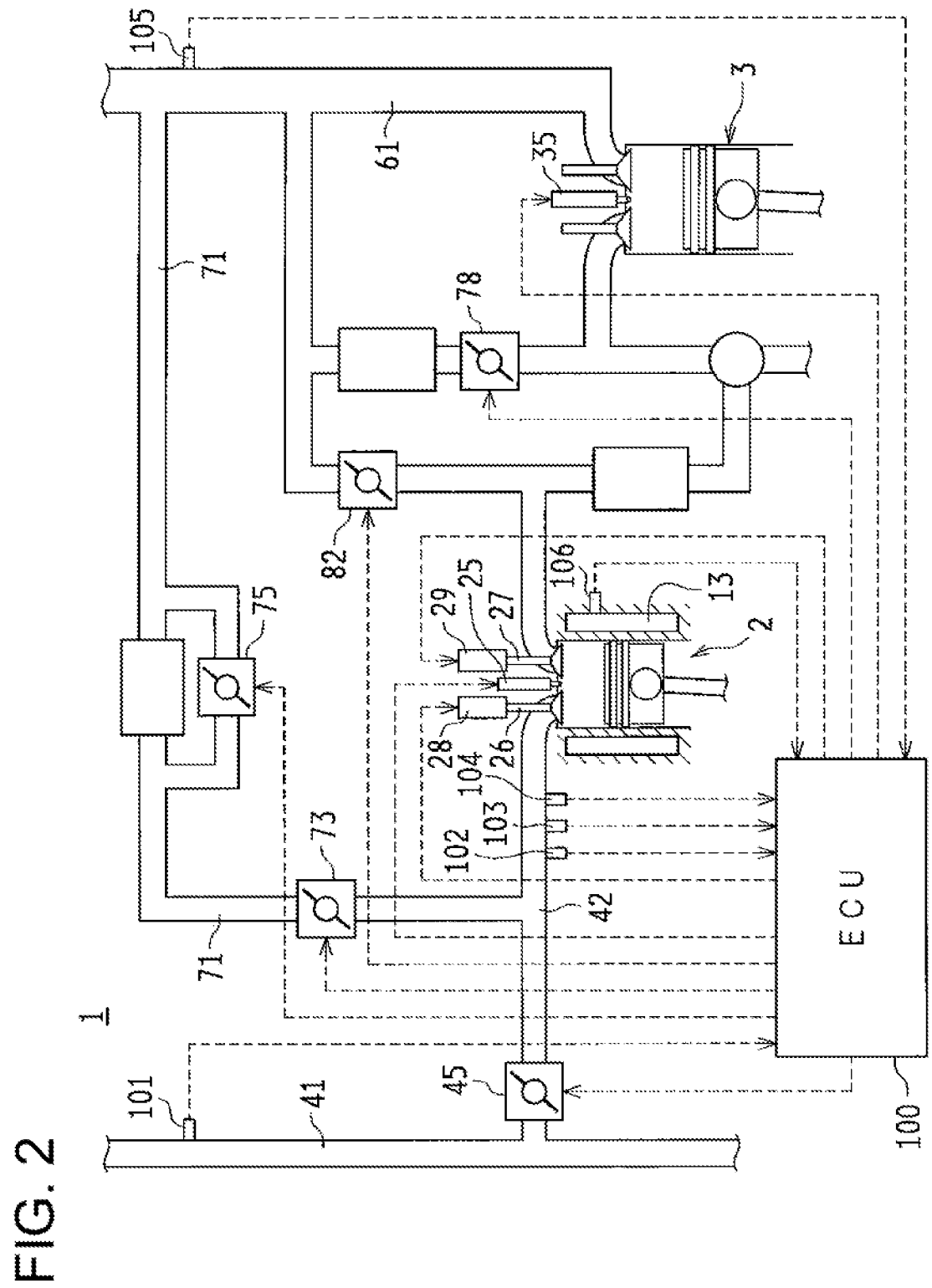
FIG. 2 A diagram showing a schematic structure of a control system of the internal combustion engine.

FIG. 2 is a diagram showing a schematic structure of a control system of the internal combustion engine 1. The internal combustion engine 1 is provided with an ECU (Electronic Control Unit) 100 serving as a control device for controlling various actuators in the internal combustion engine 1. The ECU 100 includes a CPU (Central Processing Unit), a ROM (Read Only Memory), a RAM (Random Access Memory), a backup RAM, and the like.

The ROM stores various control programs, a map which is referred to at a time of executing the various control programs, and the like. The CPU executes arithmetic processing based on the various control programs and maps stored in the ROM. Further, the RAM is a memory for temporarily storing the calculation result of the CPU and data input from various sensors. Further, the backup RAM is a nonvolatile memory which stores data and the like to be saved at a time of system shutdown and the like.

As shown in FIG. 2, the internal combustion engine 1 includes an intake-air flow sensor 101, a taken-in gas pressure sensor 102, a taken-in gas temperature sensor 103, a taken-in gas $O_2$ sensor 104, an exhaust pressure sensor 105, a water temperature sensor 106, and the like.

The intake-air flow sensor 101 transmits, to the ECU 100, an output signal corresponding to the flow rate of the taken-in air (air) flowing in the main air-intake passage 41.

The taken-in gas pressure sensor 102 transmits, to the ECU 100, an output signal corresponding to the pressure of the taken-in gas flowing in the fuel reformation cylinder air-intake passage 42. Specifically, an output signal corresponding to the pressure of the taken-in gas in the fuel reformation cylinder air-intake passage 42, on the downstream side of a portion communicating with the fuel reformation cylinder EGR passage 71 is transmitted to the ECU 100.

The taken-in gas temperature sensor 103 transmits, to the ECU 100, an output signal corresponding to the temperature of the taken-in gas flowing in the fuel reformation cylinder air-intake passage 42. Specifically, an output signal corresponding to the taken-in gas temperature of the fuel reformation cylinder air-intake passage 42, on the downstream side of a portion communicating with the fuel reformation cylinder EGR passage 71 is transmitted to the ECU 100.

The taken-in $O_2$ sensor 104 transmits, to the ECU 100, an output signal corresponding to the concentration of oxygen in the taken-in gas flowing in the fuel reformation cylinder air-intake passage 42. Specifically, an output signal corresponding to the oxygen concentration in the taken-in gas in the fuel reformation cylinder air-intake passage 42, on the downstream side of a portion communicating with the fuel reformation cylinder EGR passage 71 is transmitted to the ECU 100.

The exhaust pressure sensor 105 transmits, to the ECU 100, an output signal corresponding to the pressure of the exhaust gas flowing in the exhaust passage 61. Specifically, an output signal corresponding to the exhaust pressure of the exhaust passage 61 on the upstream side of the portion communicating with the fuel reformation cylinder EGR passage 71 is transmitted to the ECU 100.

The water temperature sensor 106 transmits, to the ECU 100, an output signal corresponding to the temperature of the cooling water flowing in the cooling water passage 13 formed in the cylinder block. Specifically, an output signal corresponding to the temperature of the cooling water flowing in the cooling water passage 13 formed around the fuel reformation cylinder 2 is transmitted to the ECU 100.

The ECU 100 is electrically connected to each of the injectors 25, 35, the adjusting valves 45, 73, 75, 78, 82, and the like. Further, the air-intake valve 26 and the exhaust valve 27 of the fuel reformation cylinder 2 are provided with variable valve units 28, 29, respectively. This way, the opening and closing timing of the valves 26, 27 can be adjusted. The ECU 100 is also electrically connected to these variable valve units 28, 29. Based on the output signals from the above described various sensors 101 to 106 and the like, the ECU 100 performs: fuel injection control (opening and closing control of the injectors 25, 35) of the injectors 25, 35; opening and closing control of the adjustment valves 45, 73, 75, 78, 82 (gas flow rate control), and opening and closing timing control of the valves 26, 27 by variable valve units 28, 29.

—Basic Operation of Internal Combustion Engine—

Next, a basic operation of the internal combustion engine 1 configured as described above will be described.

The air introduced into the main air-intake passage 41 is pressurized by the compressor wheel 12*a* of the turbocharger 12. The air is then branched into the fuel reformation cylinder air-intake passage 42 and the output cylinder air-intake passage 43. At this time, the flow rate of the taken-in air flowing through the fuel reformation cylinder air-intake passage 42 is adjusted by the air-intake amount adjust valve 45. Further, the EGR gas having flown through the fuel reformation cylinder EGR system 7A is introduced into the fuel reformation cylinder air-intake passage 42. At this time, the amount of the EGR gas introduced into the fuel reformation cylinder air-intake passage 42 is adjusted by the EGR gas amount adjusting valve 73. Further, the temperature of the EGR gas introduced into the fuel reformation cylinder air-intake passage 42 is adjusted by the EGR gas amount bypassing the EGR gas cooler 72 according to the opening degree of the bypass amount adjusting valve 75. As a result, the air and the EGR gas are introduced into the fuel reformation chamber 23 of the fuel reformation cylinder 2. At this time, the flow rate of the taken-in air adjusted by the opening degree of the air-intake amount adjust valve 45, the flow rate of the EGR gas adjusted by the opening degree of the EGR gas amount adjusting valve 73, and the temperature of the EGR gas adjusted by the opening degree of the bypass amount adjusting valve 75 are adjusted so as to set a high equivalence ratio in the fuel reformation chamber 23, and to achieve a gas temperature in the fuel reformation chamber 23 that enables favorable fuel reformation. Specifically, the opening degrees of the air-intake amount adjust valve 45, the EGR gas amount adjusting valve 73, and the bypass amount adjusting valve 75 are set so that the equivalence ratio in the fuel reformation chamber 23 at the time of supplying the fuel from the injector 25 to the fuel reformation chamber 23 is, for example, 2.5 or more (preferably, 4.0 or more) and the gas temperature of the fuel reformation chamber 23 is at least a lower limit value of a reforming reaction enabling temperature, according to an opening degree setting map prepared in advance based on an experiment or a simulation.

Through the process described above, fuel is supplied from the injector 25 to the fuel reformation chamber 23 while the air and the EGR gas are introduced into the fuel reformation chamber 23 of the fuel reformation cylinder 2. The fuel supply amount from the injector 25 is basically set according to the required engine power. Specifically, the valve opening period of the injector 25 is set so as to achieve a target fuel supply amount according to the fuel pressure in the injector 25. The opening timing of the injector 25 in this case is preferably set such that injection of the target fuel supply amount is completed by the time the air-intake stroke of the fuel reformation cylinder 2 is finished. However, the fuel injection period may be continued up to the middle of the compression stroke, if evenly mixed air-fuel mixture is obtainable before the piston 22 approaches the compression top dead point. This generates a homogeneous mixture (air-fuel mixture having a high equivalence ratio) in the fuel reformation chamber 23 before the piston 22 reaches the compression top dead point.

While the piston 22 moves toward the compression top dead point, the pressure and the temperature of the fuel reformation chamber 23 increase. In the fuel reformation chamber 23, the air-fuel mixture having a high equivalence ratio (e.g., air-fuel mixture having an equivalent ratio of 4.0 or more) is adiabatically compressed. As a result, the dehydrogenation reaction of the fuel, a partial oxidation reaction, a steam reforming reaction, and a thermal dissociation reaction take place under a high temperature and high pressure environment, thus reforming the fuel to generate reformed fuel having a high anti-knock property, such as hydrogen, carbon monoxide, and methane.

The reformed fuel discharged from the fuel reformation chamber 23 is cooled in the reformed fuel cooler 52 while the reformed fuel flows through the reformed fuel supply passage 51. With this cooling, preignition of the reformed fuel in the output cylinder air-intake passage 43 and the combustion chamber 33 is suppressed or reduced. The cooled reformed fuel is then mixed with the air flowing in the output cylinder air-intake passage 43 in the mixer 53, and is supplied to the combustion chamber 33 of the output cylinder 3. Further, the EGR gas amount adjusting valve 78 is opened as needed to introduce the EGR gas into the combustion chamber 33 of the output cylinder 3 through the output cylinder EGR passage 76.

Through the above process, the air, the reformed fuel, and the EGR gas are introduced into the combustion chamber 33 of the output cylinder 3, and the equivalence ratio in the combustion chamber 33 is adjusted to approximately 0.1 to 0.8.

In the compression stroke, the leaned mixed gas is adiabatically compressed in the output cylinder 3. When the piston 32 reaches the compression top dead point, a small amount of fuel is injected from the injector 35. This ignites the air-fuel mixture in the combustion chamber 33, and premixed combustion of the lean mixture is performed. In cases where the air-fuel mixture in the combustion chamber 33 is self-ignited (premixed compression self-ignition) without injection of the fuel from the injector 35, the injection of the fuel from the injector 35 is not necessarily required.

The above combustion reciprocates the piston 32 and rotates the crankshaft 11, thereby outputting an engine power. This engine power is transmitted to the screw shaft. Also, a part of the engine power is used as a drive source for the reciprocating movement of the piston 22 in the fuel reformation cylinder 2.

Further, at a time of cold start of the internal combustion engine 1, a not-shown starter rotates (cranks) the crankshaft 11, and a predetermined amount of fuel is injected from the injectors 25, 35 of the fuel reformation cylinder 2 and the output cylinder 3, respectively. The fuel injection at this time is set so that the equivalence ratio in each of the fuel reformation chamber 23 and the combustion chamber 33 is less than 1. Through the above, compressed ignition combustion takes place in each of the fuel reformation chamber 23 of the fuel reformation cylinder 2 and the combustion chamber 33 of the output cylinder 3. Then, when the warm-up of the fuel reformation cylinder 2 proceeds and the temperature reaches a temperature that enables the reforming reaction, the operation is switched to an operation for generating the reformed fuel. As described above, the fuel reformation cylinder 2 can function as a cylinder for obtaining an engine power as in the case of the output cylinder 3, and can function as a fuel reformation device as hereinabove described.

At the time of stopping supply of the reformed fuel to the output cylinder 3 due to emergency stop and the like of the internal combustion engine 1, the bypass amount adjusting valve 82 is opened. This introduces the reformed fuel into the exhaust passage 61 via the output cylinder bypass passage 81, and stops supply of the reformed fuel to the output cylinder 3.

With this internal combustion engine 1, combustion (uniform lean combustion) of the lean mixture is performed in the output cylinder 3. The NOx emission amount and the soot discharge amount can therefore be reduced. Thus, it is possible to eliminate or significantly reduce the capacity of a post-processing apparatus for purifying exhaust gas. Further, since a fuel with a high anti-knock property is combusted, knocking is suppressed or reduced, and since diesel micro-pilot ignition enables combustion at a suitable timing, the combustion efficiency can be also improved.

—Reforming Reaction Possible Range—

The following describes a condition for enabling a reforming reaction in the fuel reformation chamber 23 of the fuel reformation cylinder 2. To enable the fuel reforming reaction, the equivalence ratio of the air-fuel mixture in the fuel reformation chamber 23 and the temperature of the fuel reformation chamber 23 (gas temperature) both need to be within a range that enables the reforming reaction. Further, the gas temperature required for causing the reforming reaction of the fuel is different depending on the equivalence ratio of the air-fuel mixture in the fuel reformation chamber 23. Therefore, to enable the fuel reforming reaction, the temperature of the fuel reformation chamber 23 needs to be a temperature (temperature which is equal to or higher than the lowest temperature that enables the reforming reaction) according to the equivalence ratio of the air-fuel mixture.

Figure 3:
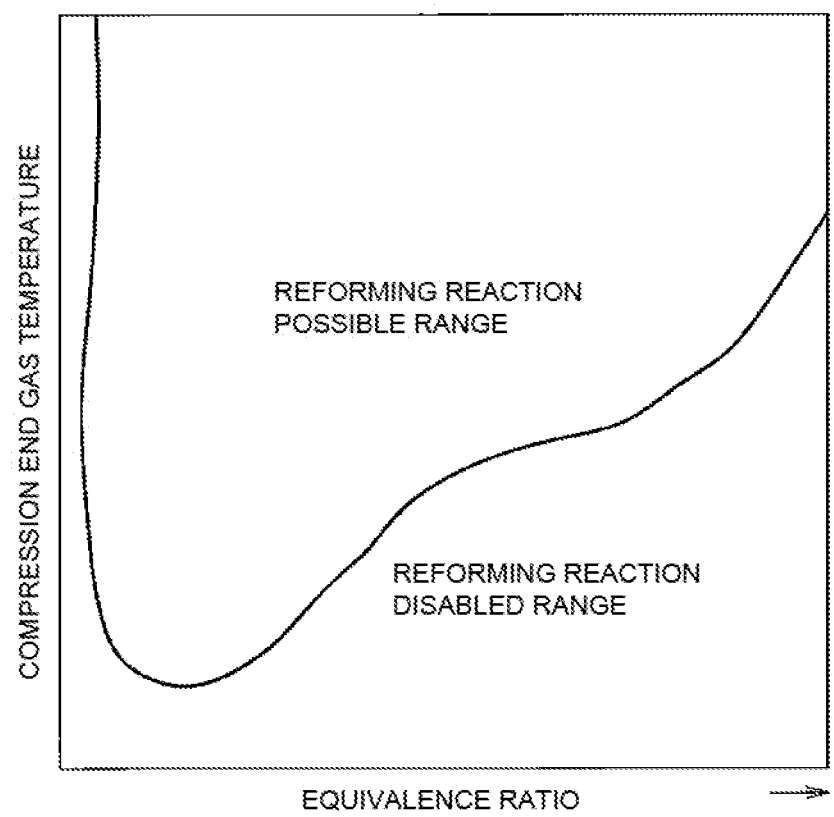
FIG. 3 A diagram showing the relationship among an equivalence ratio, a compression end gas temperature, and a reforming reaction possible range.

FIG. 3 is a diagram showing a relationship amongst an equivalence ratio of air-fuel mixture in the fuel reformation chamber 23 (horizontal axis), a gas temperature in the fuel reformation chamber 23 at a time point when the piston 22 reaches the compression top dead point in the fuel reformation cylinder 2 (hereinafter, compression end gas temperature; vertical axis), and the reforming reaction possible range. As shown in FIG. 3, to enable a reforming reaction in the fuel reformation chamber 23, an equivalent ratio of a predetermined value or more (e.g., 2 or more) is required as an equivalence ratio of the air-fuel mixture in the fuel reformation chamber 23, and the compression end gas temperature required for reforming reaction increases with an increase in the equivalence ratio. That is, to enable reforming reaction in the fuel reformation chamber 23, the compression end gas temperature needs to be increased with an increase in the equivalence ratio of the air-fuel mixture in the fuel reformation chamber 23.

—Compression End Gas Temperature and Concentration of Gas Component—

Next, the following describes the concentration of each gas component in the reformed fuel generated according to the compression end gas temperature. FIG. 4 to FIG. 7 show the relationship between the compression end gas temperature and the concentration of each gas component in the reformed fuel at an equivalence ratio, which resulted in experimental measurement.

Figure 4:
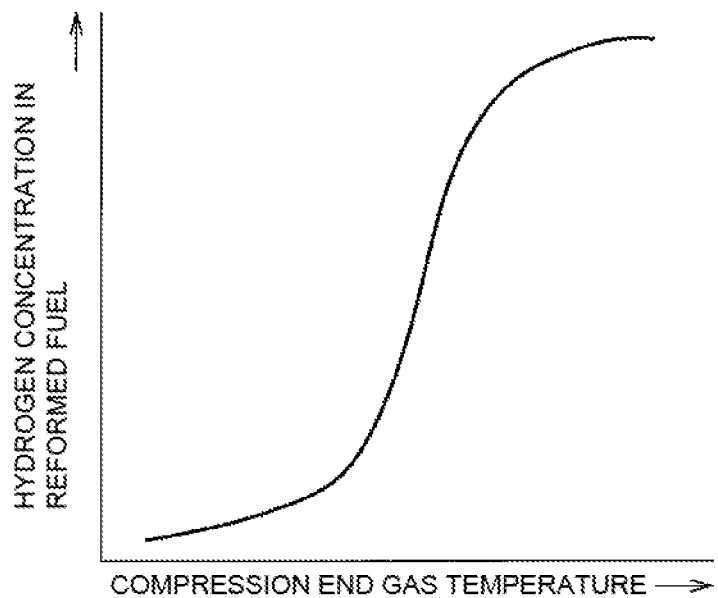
FIG. 4 A diagram showing an example relationship between the compression end gas temperature and the concentration of hydrogen in the reformed fuel.

FIG. 4 is diagram showing an example relationship between the compression end gas temperature and the concentration of hydrogen in the reformed fuel generated. As shown in FIG. 4, the higher the compression end gas temperature, the higher the concentration of hydrogen in the reformed fuel generated. Further, in an area where the compression end gas temperature is relatively low and in an area where the compression end gas temperature is relatively high, the hydrogen concentration increases less with respect to an increase in the compression end gas temperature. As should be understood from this, the hydrogen concentration in the reformed fuel depends on the compression end gas temperature.

Figure 5:
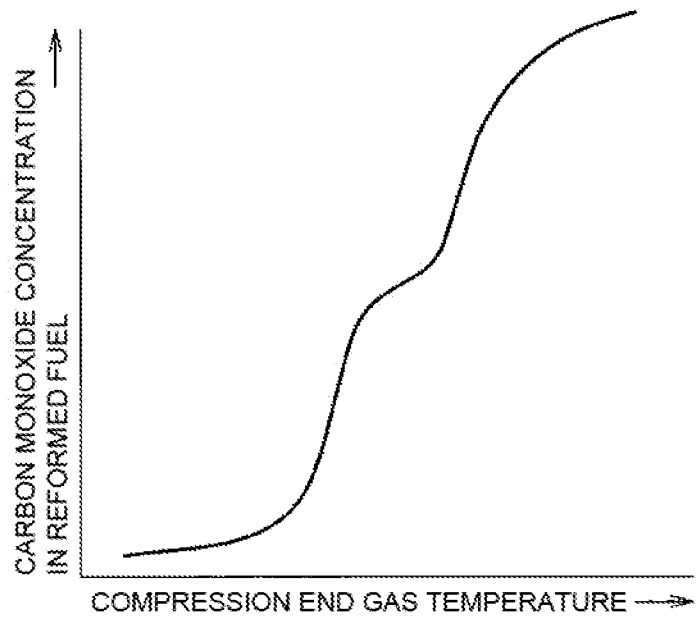
FIG. 5 A diagram showing an example relationship between the compression end gas temperature and the concentration of carbon monoxide in the reformed fuel.

FIG. 5 is diagram showing an example relationship between the compression end gas temperature and the concentration of carbon monoxide in the reformed fuel generated. As shown in FIG. 5, the higher the compression end gas temperature, the higher the concentration of carbon monoxide in the reformed fuel generated. Further, there are several temperature zones (temperature zones of the compression end gas temperature) where an increase in the carbon monoxide becomes less with respect to an increase in the compression end gas temperature. In other words, there are a plurality of inflection points in the change in the concentration of carbon monoxide associated with an increase in the compression end gas temperature. As should be understood from this, the concentration of carbon monoxide in the reformed fuel also depends on the compression end gas temperature.

Figure 6:
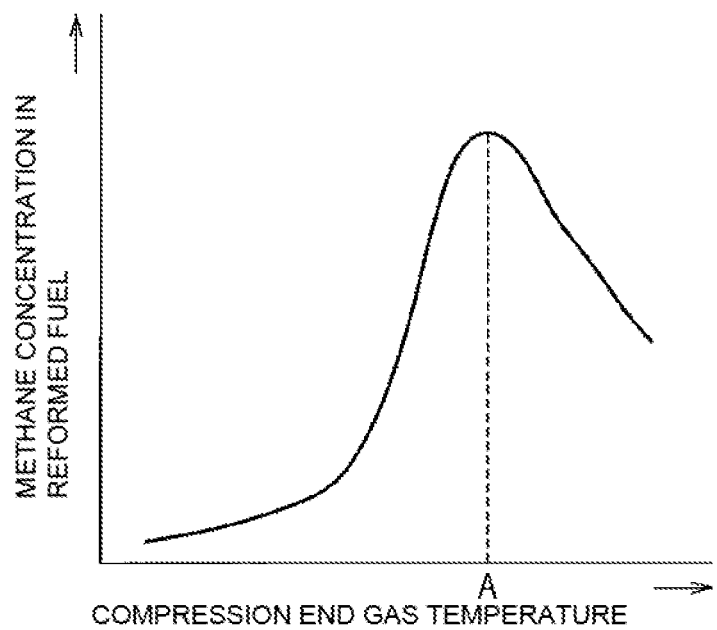
FIG. 6 A diagram showing an example relationship between the compression end gas temperature and the concentration of methane in the reformed fuel.

FIG. 6 is diagram showing an example relationship between the compression end gas temperature and the concentration of methane in the reformed fuel generated. As shown in FIG. 6, in a range of the compressed end gas temperature from a predetermined value A and below, the compression end gas temperature increases with an increase in the concentration of methane in the reformed fuel generated. However, in the range of the compressed end gas temperature higher than the predetermined value A, the concentration becomes lower with an increase in the compression end gas temperature. In other words, a maximum value exists in the change in the concentration of methane associated with an increase in the compression end gas temperature. This is considered to be because, when the compression end gas temperature exceeds a predetermined value A, decomposition or partial oxidation reaction of methane in the reformed fuel is progressed, resulting in generation of hydrogen, carbon monoxide, and the like. As should be understood from this, the concentration of methane in the reformed fuel also depends on the compression end gas temperature.

Figure 7:
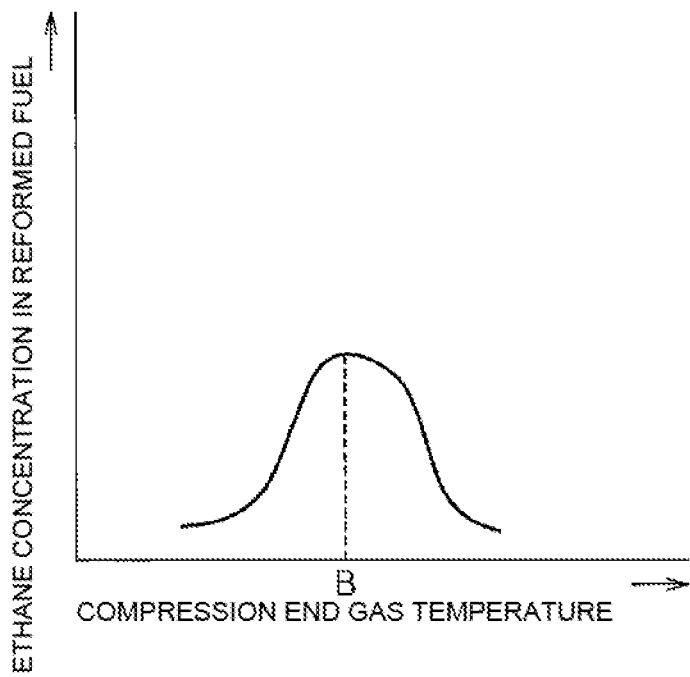
FIG. 7 A diagram showing an example relationship between the compression end gas temperature and the concentration of ethane in the reformed fuel.

FIG. 7 is diagram showing an example relationship between the compression end gas temperature and the concentration of ethane in the reformed fuel generated, while the equivalence ratio is particularly high. As shown in FIG. 7, in a range of the compressed end gas temperature from a predetermined value B and below, the compression end gas temperature increases with an increase in the concentration of ethane in the reformed fuel generated. However, in the range of the compressed end gas temperature higher than the predetermined value B, the concentration becomes lower with an increase in the compression end gas temperature. In other words, a maximum value also exists in the change in the concentration of ethane associated with an increase in the compression end gas temperature. This is considered to be because, when the compression end gas temperature exceeds a predetermined value B, decomposition or partial oxidation reaction of ethane in the reformed fuel is progressed, resulting in generation of methane, and the like. As should be understood from this, the concentration of ethane in the reformed fuel also depends on the compression end gas temperature. Further, the compression end gas temperature (the predetermined value B) where the maximum value of the change in the concentration of ethane occurs is lower than the compression end gas temperature (the predetermined value A) where the maximum value of the change in the concentration of methane occurs.

As should be understood from this, the concentration of each gas component in the reformed fuel depends on the compression end gas temperature. Further, it was confirmed by experiments that, if the equivalence ratio in the fuel reformation cylinder 2 changes, the concentration of each gas component changes even if the compression end gas temperature. Therefore, the concentration of each gas component can be adjusted by adjusting the gas temperature in the fuel reformation cylinder 2 at the time of fuel reformation according to the equivalence ratio in the fuel reformation cylinder 2.

In the present embodiment, a gas temperature in the fuel reformation cylinder 2 at the time of fuel reformation is adjusted according to an equivalence ratio in the fuel reformation cylinder 2 so that a concentration of a specific gas component (e.g., hydrogen, carbon monoxide, methane, ethane, as described above) in the reformed fuel generated in the fuel reformation cylinder 2 is a target concentration defined according to a required engine power. For example, a higher gas temperature in the fuel reformation cylinder 2 at the time of fuel reformation is set for a higher target concentration of hydrogen as the gas component in the reformed fuel generated in the fuel reformation cylinder 2. Further, a higher gas temperature in the fuel reformation cylinder 2 at the time of fuel reformation is set for a higher target concentration of carbon monoxide as the gas component in the reformed fuel generated in the fuel reformation cylinder 2.

More specifically, the gas temperature (compression end gas temperature) in the fuel reformation cylinder 2 at the timing of the piston 22 reaching the compression top dead point in the fuel reformation cylinder 2 is adjusted according to the equivalence ratio in the fuel reformation cylinder 2. This way, the output obtained by combustion of the reformed fuel in the output cylinder 3 can be adjusted to the required engine power, without a significant change in the amount of fuel supplied to the fuel reformation cylinder 2.

—Reformed Fuel Composition Map—

Figure 8:
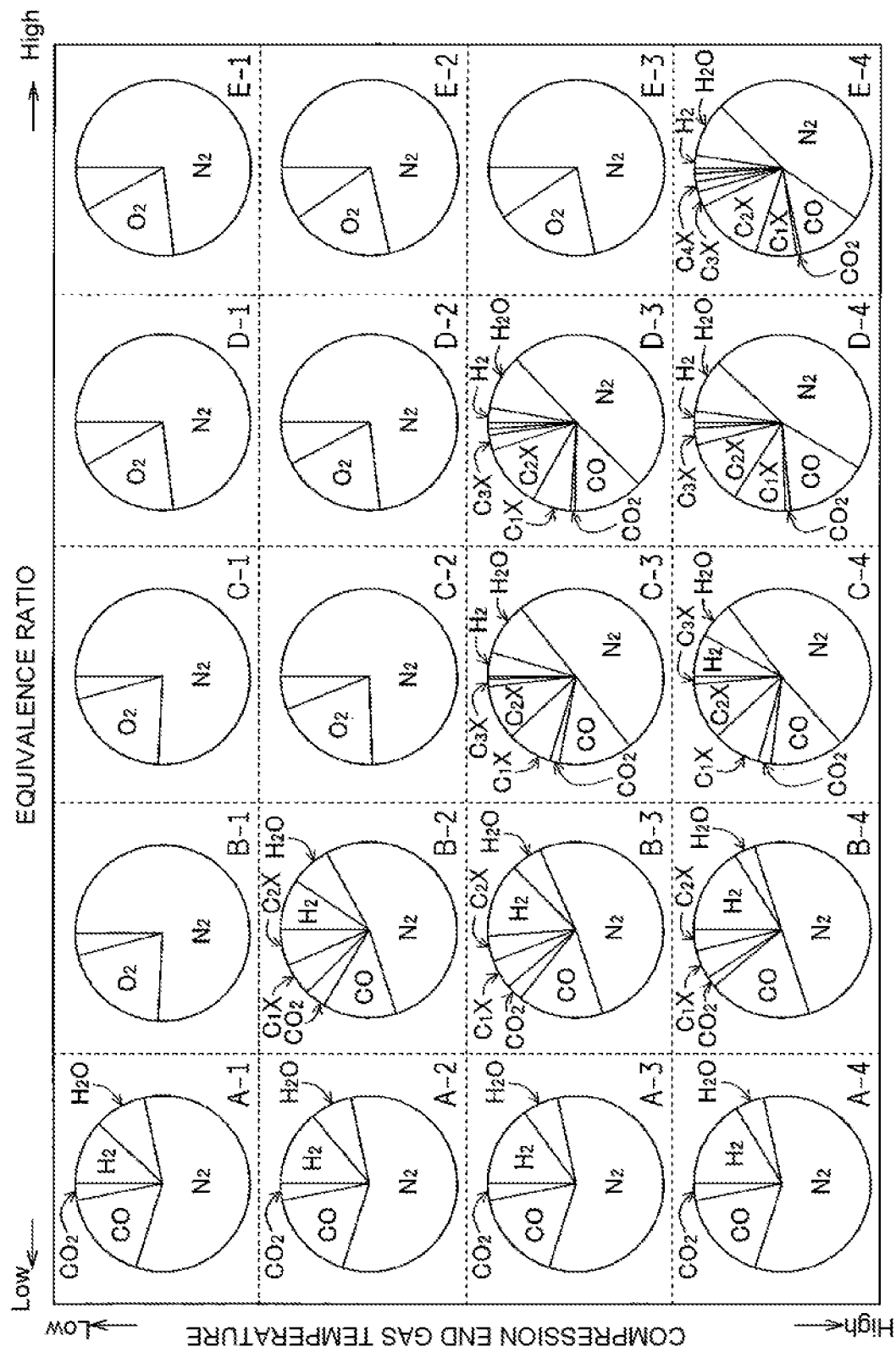
FIG. 8 A diagram showing an example of reformed fuel composition map.

FIG. 8 is a diagram showing an example of a reformed fuel composition map stored in the ROM of the ECU 100. In this reformed fuel composition map, the horizontal axis represents an equivalence ratio of the air-fuel mixture in the fuel reformation chamber 23. Further, the vertical axis represents the compression end gas temperature. In each equivalence ratio, if the compression end gas temperature is different, the concentration of each gas component in the reformed fuel is also different. This is because, as described above with reference to FIG. 4 to FIG. 7, the concentration of each gas component in the reformed fuel depends on the compression end gas temperature of the reformed.

The reformed fuel composition map is created through an experiment or a simulation.

Therefore, by adjusting the compression end gas temperature according to the equivalence ratio of the air-fuel mixture in the fuel reformation chamber 23 based on the reformed fuel composition map, the concentration of each gas component in the reformed fuel can be adjusted. For example, in cases where the compression end gas temperature is set to be high, the concentration of hydrogen, carbon monoxide, and methane, which is a reformed fuel having high anti-knock property, can be increased even if the equivalence ratio is the same. In cases where the compression end gas temperature is set to be low, the concentration of ethane or the like, which is a reformed fuel having low anti-knock property (high ignition property), can be increased.

The reformed fuel composition map of FIG. 8 shows a total of 20 reformed fuel compositions (compositions of reformed fuel corresponding to combinations of the equivalent ratio and the compression end gas temperature). The equivalence ratio of the air-fuel mixture in the fuel reformation chamber 23 is divided into five stages. For each stage of the equivalence ratio, there are four stages of the compression end gas temperature. For example, according to the map values of A-1 to A-4 each having the lowest equivalence ratio, the concentration of hydrogen $H_2$ can be increased by raising the compression end gas temperature. Further, according to the map values of B-2 to B-4 each having the second lowest equivalence ratio, the concentrations of hydrogen $H_2$ and carbon monoxide CO can be increased by raising the compression end gas temperature. On the other hand, the concentration of ethane $C_2X$ is lowered. In other words, the concentration of ethane $C_2X$ can be increased by lowering the compression end gas temperature. Further, according to the map values of C-3 to C-4 each having the third lowest equivalence ratio, the concentration of hydrogen $H_2$ can be increased by raising the compression end gas temperature. Further, according to the map values of D-3 to D-4 each having the fourth lowest equivalence ratio, the concentrations of carbon monoxide CO and methane $C_1X$ can be increased by raising the compression end gas temperature. Further, according to the map value of E-4 having the highest equivalence ratio, the concentration of ethane $C_2X$ can be increased by raising the compression end gas temperature up to the reforming reaction enabling temperature.

Even if the equivalence ratio is the same, the combustion form in the combustion chamber 33 will be different if the concentration of each gas component in the reformed fuel is different. For example, the engine power will be different. Therefore, by adjusting the compression end gas temperature according to the required engine power, the concentration of each gas component that achieves the required engine power can be obtained. That is, by adjusting the compression end gas temperature based on the reformed fuel composition map, the concentration of each gas component that achieves the required engine power can be obtained.

Note that, in this reformed fuel composition map, B-1, C-1, C-2, D-1, D-2, and E-1 to E-3 are areas in which the reforming reaction is disabled (corresponding to reforming reaction disabled range in FIG. 3). Further, portions of the reformed fuel composition map without indication of the gas component are each the concentration of the gas component other than the gas components (nitrogen $N_2$, water vapor $H_2O$, hydrogen $H_2$, carbon monoxide CO, carbon dioxide $CO_2$, methane $C_1X$, ethane $C_2X$, and the like) shown in the reformed fuel composition map.

As described above, by adjusting the compression end gas temperature based on the reformed fuel composition map, the concentration of each gas component in the reformed fuel can be adjusted. For example, to avoid knocking during high-load operation, the compression end gas temperature is adjusted so as to increase the concentration of reformed fuel with a high anti-knock property (hydrogen $H_2$, carbon monoxide CO, methane $C_1X$, and the like). In other words, the compression end gas temperature is adjusted according to the equivalence ratio of the air-fuel mixture in the fuel reformation chamber 23 so as to increase the concentration of the reformed fuel with a high anti-knock property. On the other hand, to achieve ignition property during a low-load operation, the compression end gas temperature is adjusted so as to increase the concentration of the reformed fuel with a relatively low anti-knock property (ethane $C_2X$, and the like). In other words, the compression end gas temperature is adjusted according to the equivalence ratio of the air-fuel mixture in the fuel reformation chamber 23 so as to increase the concentration of the reformed fuel with a relatively low anti-knock property.

—Calculation of Target Compression End Gas Temperature—

Next, the following describes calculation method of the target compression end gas temperature.

Figure 9:
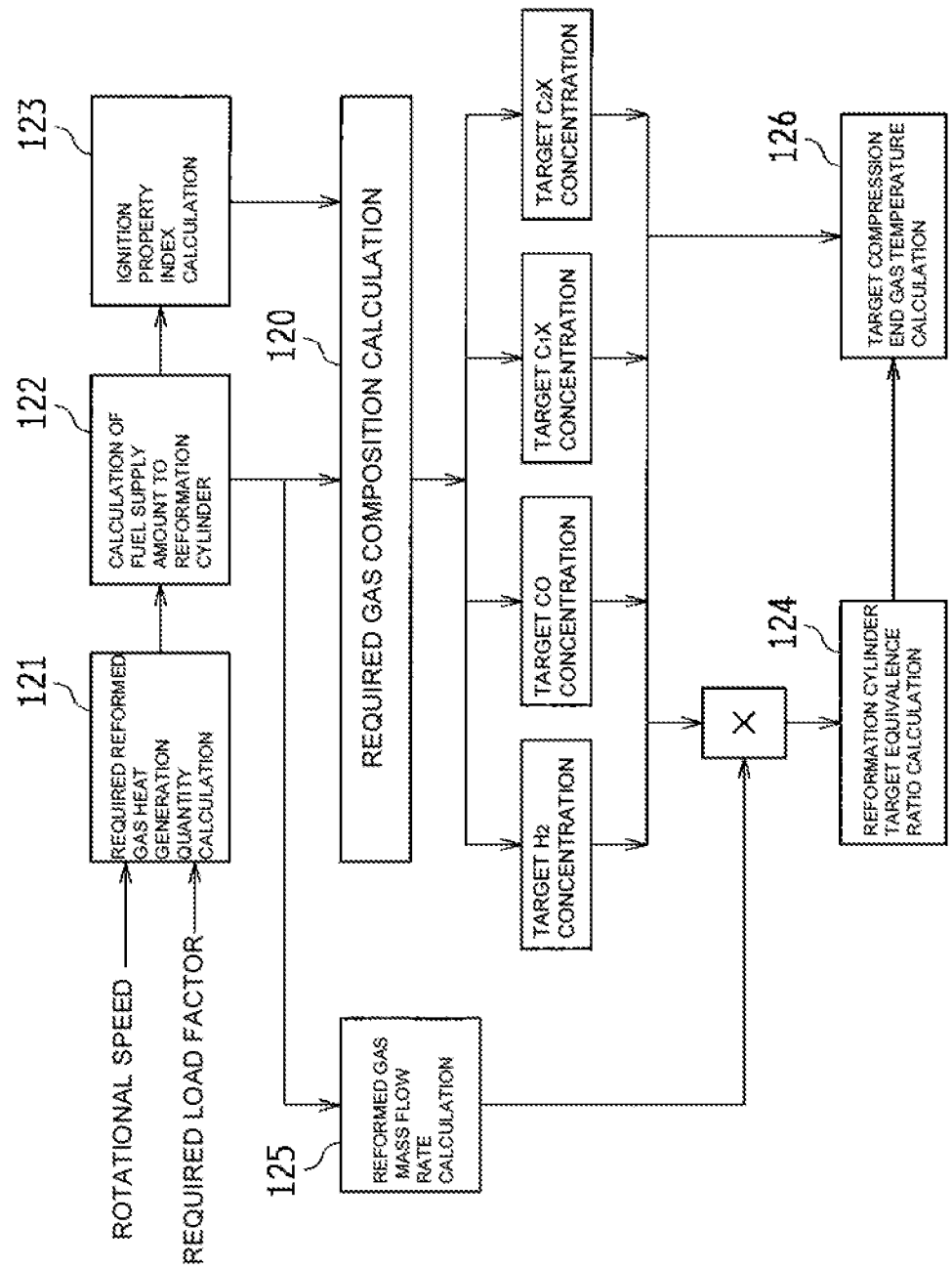
FIG. 9 A block diagram showing arithmetic logic of a target compression end gas temperature.

FIG. 9 is a block diagram showing arithmetic logic of a target compression end gas temperature. As shown in FIG. 9, in a required gas composition calculation unit 120, a gas composition (gas composition) of the reformed fuel that can achieve a target output (required engine power) without preignition in the output cylinder 3 is calculated from an operating condition such as rotational speed and required load factor of the output cylinder 3. In calculation of the required gas composition, a required heat generation quantity of the reformed fuel is first calculated by a required reformed gas heat generation quantity calculation unit 121. Based on this required heat generation quantity, the amount of fuel supplied to the fuel reformation cylinder 2 is calculated in a supplied fuel amount calculation unit 122. Then, based on these pieces of information, the ignition property of the output cylinder 3 is verified. In this case, a representative ignition property index with the operating condition is calculated in an ignition property index calculation unit 123. The higher the load, the higher the value of the ignition property index calculated. This ignition property index is determined in consideration of, not only the required load factor, but also the equivalence ratio in the output cylinder 3, an environmental condition (cooling water temperature, taken-in air temperature, and the like).

Based on these sets of data, the required gas composition at the outlet of the fuel reformation cylinder 2 is calculated in the required gas composition calculation unit 120. The required gas composition includes, for example, the concentration of hydrogen (target $H_2$ concentration), the concentration of carbon monoxide (target CO concentration), the concentration of hydrocarbon having 1 carbon atom whose main component is methane (target $C_1X$ concentration), and the concentration of hydrocarbon having 2 carbon atoms whose main component is ethane or ethylene (target $C_2X$ concentration). Water vapor $H_2O$, carbon dioxide $CO_2$, and the like are also taken into consideration in addition to these.

Further, since it is necessary to supply an amount of reformed fuel that can satisfy the output of the output cylinder 3, the equivalence ratio is calculated in a reformation cylinder target ratio calculation unit 124 in consideration of the total heat generation quantity of the reformed fuel. At this time, based on the amount of fuel supplied to the fuel reformation cylinder 2 calculated in the supplied fuel amount calculation unit 122, a mass flow rate of the reformed fuel (hereinafter, sometimes referred to as reformed gas) is calculated in a reformed gas mass flow rate calculation unit 125. Then, by multiplying the mass flow rate of the reformed gas by the target concentration of each gas component, the target amount of each gas component is calculated. Based on this, the equivalence ratio is calculated in consideration of the total heat generation quantity of the reformed fuel.

Then, with reference to the reformed fuel composition map, the target compression end gas temperature is calculated in the target compression end gas temperature calculation unit 126, according to the target concentration of each gas component and the equivalence ratio of the fuel reformation cylinder 2. When the target concentration of each gas component is not in the map value on the reformed fuel composition map and the concentration is between the two map values, the target compression end gas temperature is calculated and complemented to obtain the concentration between the two map values.

Since the target compression end gas temperature is calculated as described above, this target compression end gas temperature calculated in the target compression end gas temperature calculation unit 126 corresponds to the gas temperature in the fuel reformation cylinder at the time of fuel reformation "adjusted according to an equivalence ratio in the fuel reformation cylinder so that a concentration of a specific gas component (hydrogen $H_2$, carbon monoxide CO, methane $C_1X$, ethane $C_2X$, in this case) in the reformed fuel generated in the fuel reformation cylinder is a target concentration defined according to a required engine power" of the present invention.

—Calculation of Compression End Gas Temperature—

As described above, to adjust the compression end gas temperature in the fuel reformation chamber 23 to the target compression end gas temperature, the current compression end gas temperature needs to be calculated and a temperature adjustment is necessary according to the deviation between the current compression end gas temperature and the target compression end gas temperature.

The following describes an operation for calculating the current compression end gas temperature, for adjusting the compression end gas temperature to the target compression end gas temperature.

The actual compression end gas temperature in the fuel reformation chamber 23 can be calculated (estimated) by the following formula (1).

$$T_{TDC} = C_{react} \cdot T_{ini} \cdot \varepsilon^{\kappa-1} \qquad \text{[Formula 1]}$$

In the formula (1), $T_{TDC}$ is the compression end gas temperature, $T_{ini}$ is the gas temperature before the compression; i.e., the taken-in gas temperature, ε is the effective compression ratio of the fuel reformation cylinder 2, κ is the polytropic number of the taken-in gas in the fuel reformation chamber 23, and $C_{react}$ is a correction coefficient taking into consideration an increase in the temperature associated with a reforming reaction (in particular, partial oxidation reaction) in the fuel reformation chamber 23 (an increase in the temperature due to a reforming reaction when the piston 22 reaches the compression top dead point).

The following describes, calculation of each parameter in the formula (1).

(Intake-Gas Temperature $T_{ini}$)

The taken-in gas temperature $T_{ini}$ is calculated based on the output signal from the taken-in gas temperature sensor 103. The taken-in gas temperature $T_{ini}$ calculated here is the temperature of the taken-in gas on the downstream side of a portion of the fuel reformation cylinder EGR passage 71 communicating with the fuel reformation cylinder air-intake passage 42.

Alternatively, the temperature of the taken-in gas flowing through the air-intake port of the fuel reformation cylinder 2 may be adopted as the taken-in gas temperature $T_{ini}$, instead of the temperature of the taken-in gas flowing through the fuel reformation cylinder air-intake passage 42. Alternatively, the gas temperature of the fuel reformation chamber 23 at the time when the piston 22 reaches the intake bottom dead point or the gas temperature of the fuel reformation chamber 23 at the time when the air-intake valve 26 is closed may be detected or estimated, and used as the taken-in gas temperature $T_{ini}$.

(Effective Compression Ratio c of Fuel Reformation Cylinder)

An effective compression ratio c of the fuel reformation cylinder 2 is calculated as a ratio of a volume of the fuel reformation chamber 23 at a time point when the air-intake valve 26 in the fuel reformation cylinder 2 is closed and a volume of the fuel reformation cylinder 23 at a time point when the piston 22 reaches the compression top dead point. The effective compression ratio c of the fuel reformation cylinder 2 may be obtained simply on a basis of the ratio of the volume of the fuel reformation chamber 23 when the piston 22 is at the bottom dead point and the volume of the fuel reformation chamber 23 when the piston 22 is at the top dead point (apparent compression ratio).

(Polytropic Number $\kappa$)

The polytropic number $\kappa$ is defined as a ratio of a specific heat at constant pressure and a specific heat at constant volume in the gas compression stroke in the fuel reformation chamber 23. When the total amount of taken-in gas is air and there is no heat outflow to the cylinder wall surface, $\kappa$=about 1.4. However, since the actual polytropic number of the taken-in gas in the fuel reformation chamber 23 differs from that in cases where the total amount is air or where there is no heat outflow. Therefore, the polytropic number is modified as described below.

To the polytropic number $\kappa$ in the formula (1), a polytropic number obtained through any one of: modification based on the cooling water temperature, modification based on the gas composition, and modification of the equivalence ratio. Alternatively, a polytropic number obtained through a combination of two or more of these modifications may be applied to the polytropic number $\kappa$ in the formula (1).

Modification of Polytropic Number Based on Cooling Water Temperature

The polytropic number $\kappa$ varies according to the amount of heat loss. As described above, the cooling water passage 13 is formed in the cylinder block, and there is a heat outflow toward the cooling water flowing through the cooling water passage 13. Therefore, the amount of heat loss can be predicted by calculating the temperature of the cooling water based on the output from the water temperature sensor 106. Alternatively, by grasping the relationship between the cooling water temperature and the amount of heat loss in advance, the amount of heat loss can be estimated from the cooling water temperature.

Figure 10:
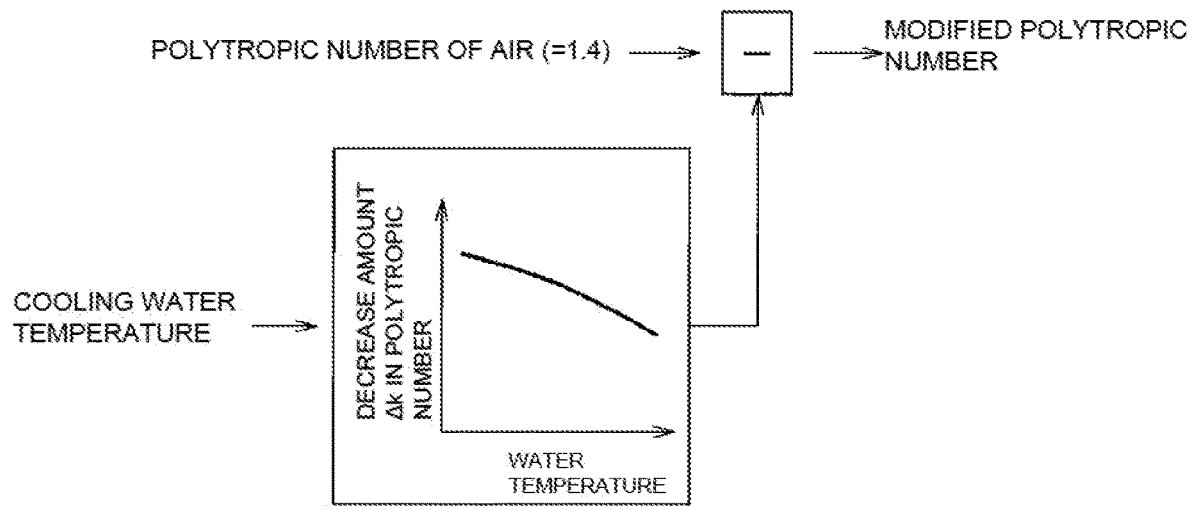
FIG. 10 A block diagram showing arithmetic logic of a modified polytropic number based on the cooling water temperature.

FIG. 10 is a block diagram showing arithmetic logic of a modified polytropic number based on the cooling water temperature. As shown in FIG. 10, a decrease amount $\Delta\kappa$ in the polytropic number is evaluated from the cooling water temperature calculated based on the output from the water temperature sensor 106. By subtracting this decrease amount from the polytropic number of the air, the modified polytropic number corresponding to the cooling water temperature (corresponding to the heat loss amount) can be obtained. The relationship between the cooling water temperature and the decrease amount $\Delta\kappa$ of the polytropic number is obtained in advance by an experiment or a simulation.

Modification of Polytropic Number based on Gas Composition

The polytropic number $\kappa$ also varies according to the gas composition in the fuel reformation chamber 23. That is, when the intake-gas is entirely the air, most of the taken-in gas is 2 atomic molecules, and the polytropic number $\kappa$ is about "1.4". On the other hand, if the intake-gas contains burned gas ($CO_2$ or $H_2O$) or a fuel, the ratio of the 2 atomic molecules decreases, and so does the polytropic number $\kappa$.

Therefore, based on an output signal from the taken-in gas $O_2$ sensor 104, a mole fraction of carbon dioxide in the taken-in gas is calculated based on the mole fraction of oxygen in the intake-gas. Then, the polytropic number is estimated based on the mole fraction of each gas component.

For example, a molar specific heat at constant pressure of the taken-in gas is first determined according to the following formula (2).

[Formula 2]

$$C_{p\_intake} = \sum_i \psi_i \cdot C_{p\_i} \qquad (2)$$

In the formula (2), $C_{p\_intake}$ is the molar specific heat at constant pressure of the taken-in gas, $\psi_i$ is the mole fraction of each gas component, and $C_{p\_\#I}$ is the molar specific heat at constant pressure of each gas component. The mole fraction $\Psi_i$ of each gas component and the molar specific heat at constant pressure $C_{p\_\#i}$ of each gas component are determined according to the type of fuel, the equivalence ratio (current equivalence ratio) of the fuel reformation chamber 23, and the like, and can be obtained according to the map (map stored in the ROM) created based on an experiment or a simulation.

Thus, the polytropic number $\kappa$ of the taken-in gas can be calculated with the following formula (3).

[Formula 3]

$$\kappa = \frac{C_{p\_intake}}{C_{p\_intake} - 8.314} \qquad (3)$$

This way, the modified polytropic number corresponding to the gas composition can be obtained.

Modification of Polytropic Number Based on Equivalence Ratio

By estimating the equivalence ratio in the fuel reformation chamber 23, the polytropic number κ can be also obtained through correcting calculation from that equivalence ratio.

Figure 11:
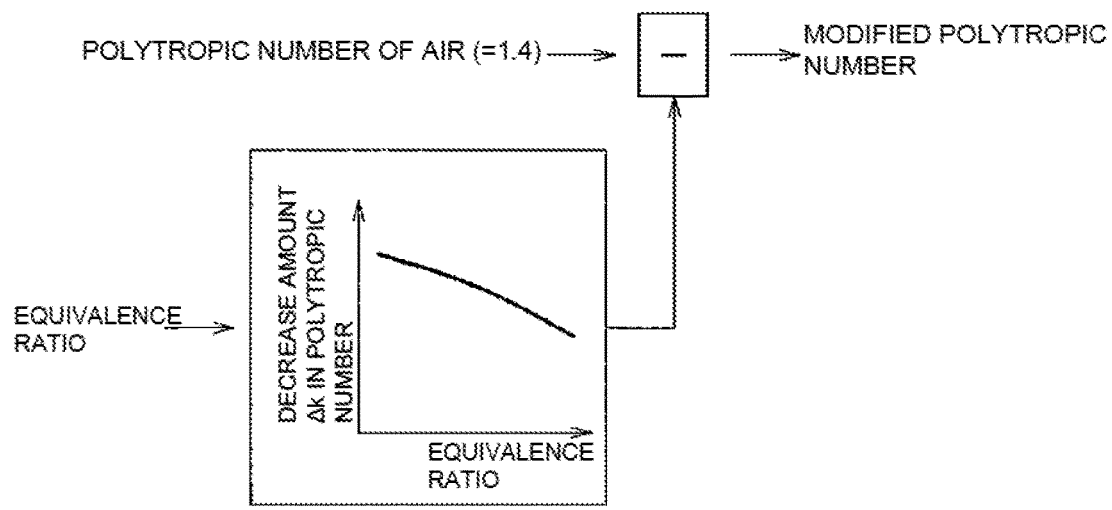
FIG. 11 A block diagram showing arithmetic logic of a modified polytropic number based on the equivalence ratio.

FIG. 11 is a block diagram showing arithmetic logic of a modified polytropic number based on the equivalence ratio. As shown in FIG. 11, a decrease amount Δκ in the polytropic number is evaluated from the equivalence ratio. By subtracting this decrease amount from the polytropic number of the air, the modified polytropic number corresponding to the equivalence ratio can be obtained. The relationship between the equivalence ratio and the decrease amount Δκ of the polytropic number is obtained in advance by an experiment or a simulation.

A method of calculating the equivalence ratio in this case is as follows. Namely, the flow rate of the taken-in air is calculated based on the output signal from the intake-air flow sensor 101. Further, an EGR gas amount (an amount of EGR gas introduced into the fuel reformation cylinder 2) is calculated from a difference between the pressure of the taken-in gas calculated based on the output signal from the taken-in gas pressure sensor 102 and the pressure of the exhaust gas calculated based on the output signal from the exhaust pressure sensor 105. The equivalence ratio is calculated from the flow rate of the taken-in air, the EGR gas amount, and the fuel supply amount to the fuel reformation chamber 23 (i.e., the fuel supply amount evaluated from an injection command value to the injector 25). In cases of not considering the EGR gas amount, the equivalence ratio may be calculated from a ratio of the flow rate of the taken-in air calculated based on the output signal from the intake-air flow sensor 101 and the fuel supply amount to the fuel reformation chamber 23.

(Correction Coefficient $C_{react}$ of Increase in Temperature Associated with Reforming Reaction)

The correction coefficient $C_{react}$ for an increase in the temperature associated with the reforming reaction is for correcting the compression end gas temperature by the amount of increase in the gas temperature due to the partial oxidation reaction, in cases where the reforming reaction is started before the piston 22 reaches the compression top dead point. By determining the start time of the reforming reaction and the heat generation quantity by the partial oxidation reaction for the operating condition through an experiment or the like, a temperature increase amount correction coefficient $C_{react}$ is stored in the ROM so that the temperature increase amount correction coefficient $C_{react}$ according to the actual operating condition can be retrieved.

Further, when the reforming reaction is not yet started when the piston 22 reaches the compression top dead point, or when the heat generation quantity by the reforming reaction is relatively small when the piston 22 reaches the compression top dead point, the temperature increase amount correction coefficient $C_{react}$ may be set to "1" in the formula (1).

Since the current compression end gas temperature is calculated as described above, a functional part for performing this operation in the ECU 100 corresponds to the gas temperature estimation unit (the gas temperature estimation unit configured to estimate the gas temperature in the fuel reformation cylinder at the timing of the piston reaching the compression top dead point) of the present invention.

—Control of Compression End Gas Temperature—

Next, the following describes control for adjusting the compression end gas temperature to the target compression end gas temperature. Examples of this control include control of the compression end gas temperature by EGR gas, control of the compression end gas temperature by changing the effective compression ratio, and control of the compression end gas temperature by changing the polytropic number. The control of compression end gas temperature is executed by the ECU 100. Therefore, the functional part of the ECU 100 that executes this control corresponds to the control device of the present invention. Further, a method of control executed by the ECU 100 corresponds to a control method of the present invention.

The compression end gas temperature may be adjusted to the target compression end gas temperature by any one of the control of the compression end gas temperature by EGR gas, the control of the compression end gas temperature by changing the effective compression ratio, and the control of the compression end gas temperature by changing the polytropic number, or two or more of these controls may be executed in combination to adjust the compression end gas temperature to the target compression end gas temperature. When two or more of them are executed to adjust the compression end gas temperature to the target compression end gas temperature, the total of the adjustment amounts of the compression end gas temperature in each control is controlled so as to match with the deviation between the current compression end gas temperature and the target compression end gas temperature.

The following describes each of the controls.

(Control of Compression End Gas Temperature by EGR Gas)

First, the following describes the control of the compression end gas temperature by EGR gas. In the control of the compression end gas temperature by EGR gas, the opening degree of the bypass amount adjusting valve 75 is controlled so as to adjust the EGR gas amount bypassing the EGR gas cooler 72, thereby adjusting the temperature of the EGR gas introduced to the fuel reformation cylinder air-intake passage 42. This way, the compression end gas temperature is adjusted. In other words, the compression end gas temperature is adjusted by adjusting the taken-in gas temperature $T_{ini}$ in the formula (1).

Figure 12:
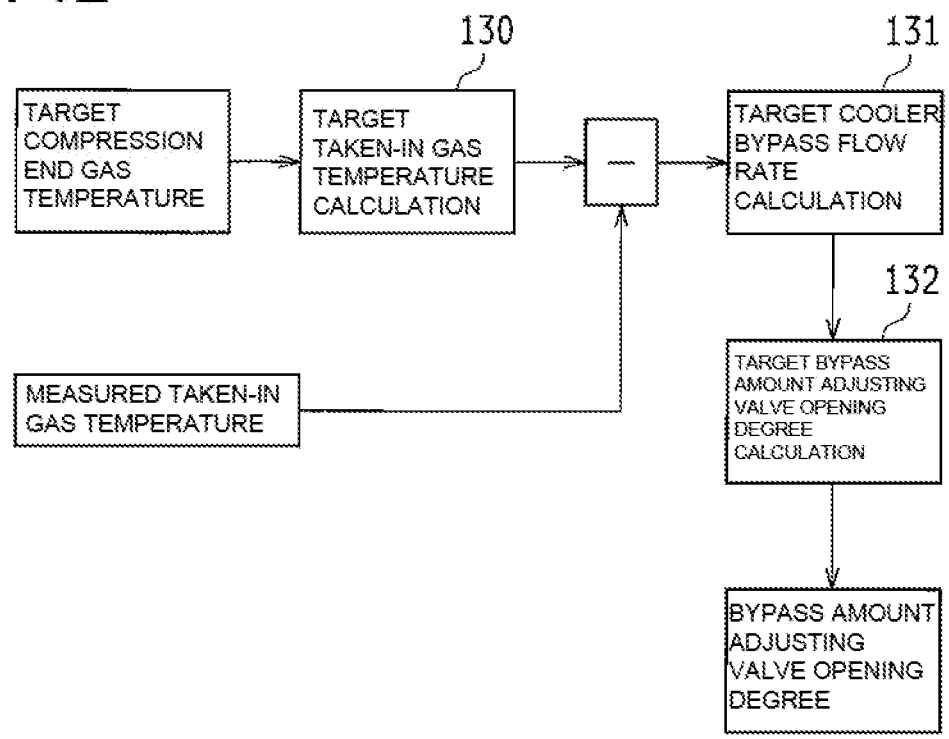
FIG. 12 A block diagram showing arithmetic logic for determining an opening degree of a bypass amount adjusting valve.

FIG. 12 is a block diagram showing arithmetic logic for determining an opening degree of the bypass amount adjusting valve 75. As shown in FIG. 12, based on the target compression end gas temperature, a target taken-in gas temperature calculation unit 130 calculates the target taken-in gas temperature. Then, based on the deviation between the taken-in gas temperature measured by the taken-in gas temperature sensor 103 and the target taken-in gas temperature, the target cooler bypass flow rate calculation unit 131 calculates the flow rate of the EGR gas that bypasses the EGR gas cooler 72. Then, based on the flow rate of EGR gas bypassing the EGR gas cooler 72, the target bypass amount adjusting valve opening degree calculating section 132 calculates the target opening degree of the bypass amount adjusting valve 75. The relationship between the flow rate of EGR gas (flow rate of EGR gas bypassing the EGR gas cooler 72) and the opening degree of the bypass amount adjusting valve 75 is determined in advance through an experiment or a simulation, and the target opening degree of the bypass amount adjusting valve 75 is calculated based on this relationship. Then, an output signal corresponding to the target opening degree, which is the result of the calculation, is output to the bypass amount adjusting valve 75.

Since the compression end gas temperature is controlled by the above described arithmetic logic, the target taken-in gas temperature calculation unit 130, the target cooler bypass flow rate calculation unit 131, and the target bypass amount adjusting valve opening degree calculating section 132 constitute the gas temperature adjustment unit (gas temperature adjustment unit that adjusts the temperature of the taken-in gas in the fuel reformation cylinder at the time of fuel reformation by adjusting the taken-in gas temperature introduced into the fuel reformation cylinder) of the present invention.

The compression end gas temperature may be controlled by adjusting the temperature of EGR gas by maintaining the opening degree of the bypass amount adjusting valve 75 constant, and adjusting the temperature or the flow rate of the cooling heat source (engine cooling water, sea water, or the like) flowing in the EGR gas cooler 72.

(Control of Compression End Gas Temperature by Changing Effective Compression Ratio)

Next, the following describes the control of the compression end gas temperature by changing the effective compression ratio. The control of the compressed end gas temperature by changing the effective compression ratio changes the effective compression ratio by adjusting the opening/closing timing of valves 26, 27 by the variable valve units 28, 29 provided in the fuel reformation cylinder 2, thereby adjusting the compression end gas temperature. In other words, the compression end gas temperature is adjusted by adjusting the effective compression ratio c in the formula (1). Example of the variable valve units 28, 29 include a conventionally known types that changes cam phase, that changes the cam lift, and that additionally provides lift to a normal valve lift.

Figure 13:
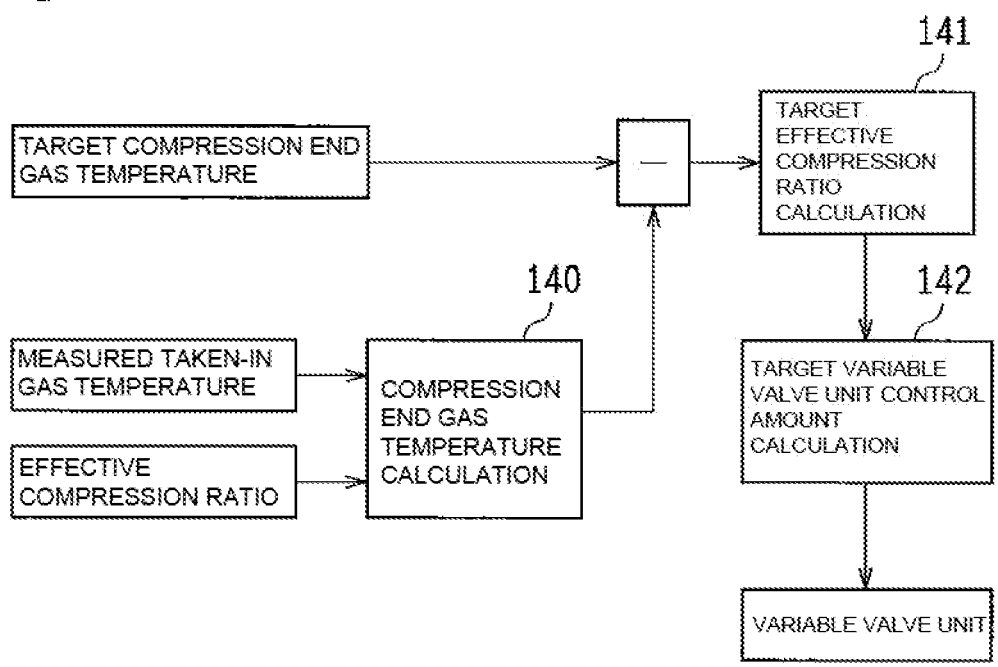
FIG. 13 A block diagram showing arithmetic logic for determining a control amount of a variable valve unit.

FIG. 13 is a block diagram showing arithmetic logic for determining a control amount of a variable valve units 28, 29. As shown in FIG. 13, a compression end gas temperature calculation unit 140 calculates the current compression end gas temperature, based on the measured taken-in gas temperature and the current effective compression ratio. Then, based on the deviation between the current compression end gas temperature and the target compression end gas temperature, a target effective compression ratio calculation unit 141 calculates a target effective compression ratio. Then, based on this target effective compression ratio, a target variable valve unit control amount calculation unit 142 calculates a control amount of the variable valve units 28, 29. Then, an output signal corresponding to the control amount, which is the result of the calculation, is output to the variable valve units 28, 29. For example, when the current compression end gas temperature is lower than the target compression end gas temperature and the effective compression ratio needs to be increased, the timing of closing the air-intake valve 26 by the variable valve unit 28 is shifted towards the bottom dead point of the piston 22. On the other hand, when the current compression end gas temperature is higher than the target compression end gas temperature and the effective compression ratio needs to be decreased, the timing of closing the air-intake valve 26 by the variable valve unit 28 is shifted towards the top dead point of the piston 22.

Since the compression end gas temperature is controlled by such arithmetic logic, the compression end gas temperature calculation unit 140, the target effective compression ratio calculation unit 141, and the target variable valve unit control amount calculation unit 142 constitute the gas temperature adjustment unit (gas temperature adjustment unit for adjusting the gas temperature in the fuel reformation cylinder at the time of fuel reformation by adjusting the effective compression ratio of the fuel reformation cylinder) of the present invention.

(Control of Compression End Gas Temperature by Changing Polytropic Number)

Next, the following describes the control of the compression end gas temperature by changing the polytropic number. In this control of the compression end gas temperature by changing the polytropic number, the opening degree of the EGR gas amount adjusting valve 73 is controlled to adjust the EGR gas amount (concentrations of 3-atom molecules such as $CO_2$ and $H_2O$) supplied to the fuel reformation chamber 23. This way, the polytropic number of the gas in the fuel reformation chamber 23 is changed by adjusting the concentration of oxygen in the fuel reformation chamber 23 without changing the fuel supply amount to the fuel reformation chamber 23. This way, an amount of partial oxidation reaction (heat generation quantity) in the reforming reaction in the fuel reformation chamber 23 is adjusted to adjust the compression end gas temperature. In other words, the compression end gas temperature is adjusted by adjusting the polytropic number κ in the formula (1).

Figure 14:
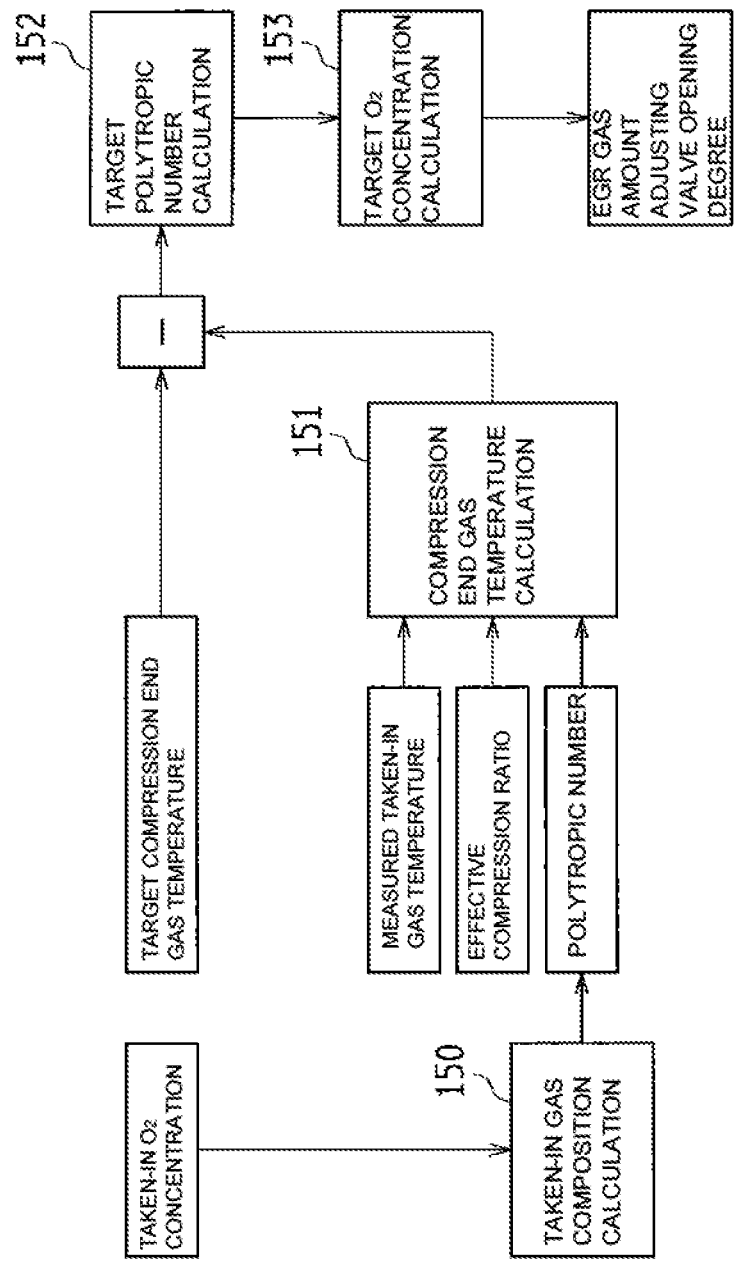
FIG. 14 A block diagram showing arithmetic logic for determining an opening degree of an EGR gas amount adjusting valve.

FIG. 14 is a block diagram showing arithmetic logic for determining an opening degree of an EGR gas amount adjusting valve 73. As shown in FIG. 14, a taken-in gas composition calculation unit 150 calculates the composition of the taken-in gas based on the oxygen concentration in the taken-in gas calculated based on the output signal from the taken-in $O_2$ sensor 104. The polytropic number of the taken-in gas is then obtained from the composition of the intake-gas. A compression end gas temperature calculation unit 151 calculates the current compression end gas temperature, based on the measured taken-in gas temperature, the current effective compression ratio, and the polytropic number. Then, based on the deviation between the current compression end gas temperature and the target compression end gas temperature, a target polytropic number calculation unit 152 calculates a target polytropic number. Then, based on this target polytropic number, a target $O_2$ concentration calculation unit 153 calculates a target $O_2$ concentration. Then, an output signal corresponding to the target $O_2$ concentration, which is the result of the calculation, is output to the EGR gas amount adjusting valve 73. The relationship between the target $O_2$ concentration and the opening degree of the EGR gas amount adjusting valve 73 is determined in advance through an experiment or a simulation. From this relationship, the opening degree of the EGR gas amount adjusting valve 73 corresponding to the output is set.

Since the compression end gas temperature is controlled by such arithmetic logic, the taken-in gas composition calculation unit 150, the compression end gas temperature calculation unit 151, the target polytropic number calculation unit 152, and the target $O_2$ concentration calculation unit 153 constitute the gas temperature adjustment unit (gas temperature adjustment unit that adjusts the gas temperature in the fuel reformation cylinder at the time of fuel reformation by adjusting the oxygen concentration of the taken-in gas introduced into the fuel reformation cylinder) of the present invention.

(Correction of Target Compression End Gas Temperature)

As described above, to enable reforming reaction in the fuel reformation chamber 23, the compression end gas temperature in the fuel reformation cylinder 2 needs to be higher with an increase in the equivalence ratio of the air-fuel mixture in the fuel reformation chamber 23. For this reason, the target compression end gas temperature needs to be corrected according to the equivalence ratio of the air-fuel mixture so as to enable the reforming reaction.

Figure 15:
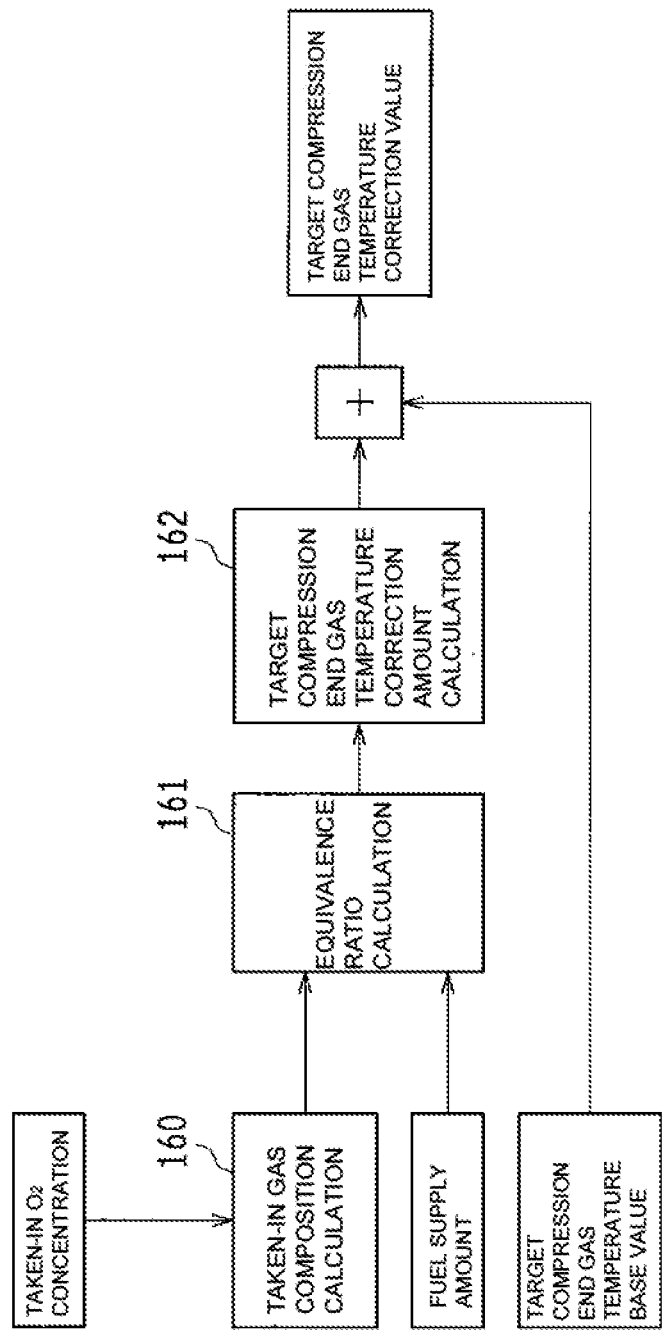
FIG. 15 A block diagram showing arithmetic logic of a correction value for the target compression end gas temperature.

FIG. 15 is a block diagram showing arithmetic logic of a correction value for the target compression end gas temperature. As shown in FIG. 15, a taken-in gas composition calculation unit 160 calculates the composition of the taken-in gas based on the oxygen concentration in the taken-in gas calculated based on the output signal from the taken-in $O_2$ sensor 104. An equivalence ratio calculation unit 161 then calculates the equivalence ratio of the fuel reformation chamber 23 based on this composition of the taken-in gas and the fuel supply amount. Then, based on this equivalence ratio, a target compression end gas temperature correction amount calculation unit 162 calculates a correction amount of the target compression end gas temperature. Then, a correction value of the target compression end gas temperature is obtained by adding the correction amount of the target compression end gas temperature to the base value of the target compression end gas temperature. This correction value of the target compression end gas temperature thus obtained corresponds to the lower limit value of the fuel reformation cylinder temperature (the lower limit value of the temperature in the fuel reformation cylinder for enabling the reforming reaction) of the present invention. That is, in the present embodiment, the lower limit value of the temperature in the fuel reformation cylinder is set according to the equivalence ratio in the fuel reformation cylinder 2, and the lower limit value of the temperature in the fuel reformation cylinder 2 is higher, for a higher equivalence ratio in the fuel reformation cylinder 2, as is described with reference to FIG. 3.

As hereinabove described, in the present embodiment, a gas temperature in the fuel reformation cylinder 2 at a time of fuel reformation is adjusted according to an equivalence ratio in the fuel reformation cylinder 2 so that a concentration of a specific gas component in the reformed fuel is a target concentration. In other words, the gas temperature in the fuel reformation cylinder 2 at the time of fuel reformation is adjusted according to the equivalence ratio in the fuel reformation cylinder 2 so as to achieve the target concentration of the specific gas component. This way, the output obtained by combustion of the reformed fuel in the output cylinder 3 can be adjusted to the required engine power, without a significant change in the amount of fuel supplied to the fuel reformation cylinder 2.

Other Embodiments

Note that the above embodiment is illustrative in all respects, and is not intended to be a basis for limiting interpretation. Accordingly, the scope of the present invention is not to be interpreted solely by the foregoing embodiments, but is defined based on the description of the appended claims. Further, the technical scope of the present invention includes all changes within the meaning and scope of the appended claims.

For example, the above embodiment deals with a case where the present invention is applied to an internal combustion engine 1 for a ship, but the present invention is also applicable to an internal combustion engine in other applications (e.g., an electric power generator, a vehicle, and the like).

Further, the above embodiment deals with a case where the injectors 25, 35 of the cylinders 2, 3 are direct injection type which directly inject fuel into the cylinders. The present invention is not limited to this, and either or both of the injectors 25, 35 may be of a port injection type.

Further, the above embodiment deals with a case where the fuel to be supplied to the fuel reformation chamber 23 is light oil. The present invention is not limited to this, and the fuel may be heavy oil, gasoline, or the like.

In addition, the above embodiment deals with a case where the fuel reformation cylinder 2 and the output cylinder 3 are operated at the same rotational speed. The present invention is not limited to this, and the speed reducer may be interposed between the cylinders 2, 3 (to the crankshaft 11 between the cylinders 2, 3), and the rotational speed of the fuel reformation cylinder 2 may be lower than the rotational speed of the output cylinder 3.

Further, the above embodiment deals with a case where the engine power obtained from the output cylinder 3 is partially used as a drive source for reciprocation of the piston 22 in the fuel reformation cylinder 2. The present invention is not limited to this, and the drive source for the fuel reformation cylinder 2 may be provided separately. For example, the fuel reformation cylinder 2 and the output cylinder 3 may be separately arranged (arranged without being connected by the crankshaft 11), and the piston 22 of the fuel reformation cylinder 2 may be reciprocated by an electric motor or the like.

It should be noted that the present invention may be embodied in various other forms without departing from the spirit or essential characteristics thereof. Therefore, each of the embodiments described above and each of the embodiments described above are merely exemplary, and should not be construed as limiting the scope of the present invention. The scope of the present invention is indicated by the appended claims and is not to be limited in any way by the text of the specification. Further, the scope of the present invention encompasses all changes and modifications falling within the scope of the appended claims.

This application claims priority from Japanese Patent Application No. 2016-139573, filed in Japan on Jul. 14, 2016. The entire content of the application is hereby incorporated in the present application by reference. The entire contents of the documents cited herein are hereby incorporated in the present application by reference.

INDUSTRIAL APPLICABILITY

The present invention is applicable to adjustment of the gas composition of a reformed fuel in an internal combustion engine including a fuel reformation cylinder and an output cylinder.

REFERENCE SIGNS LIST 1 internal combustion engine
2 fuel reformation cylinder
21 cylinder bore
22 piston
3 output cylinder
100 ECU
130 target taken-in gas temperature calculation unit
131 target cooler bypass flow rate calculation unit
132 target bypass amount adjusting valve opening degree calculating section
140 compression end gas temperature calculation unit
141 target effective compression ratio calculation unit
142 target variable valve unit control amount calculation unit
150 taken-in gas composition calculation unit
151 compression end gas temperature calculation unit
152 target polytropic number calculation unit
153 target $O_2$ concentration calculation unit

The invention claimed is:

1. A control device for an internal combustion engine including a fuel reformation cylinder and an output cylinder to which reformed fuel generated in the fuel reforming cylinder is supplied, the output cylinder being configured to yield an engine power by combusting the reformed fuel, the control device comprising:
a gas temperature adjustment unit configured to adjust a gas temperature of a gas prior to the gas being provided to the fuel reformation cylinder at a time of fuel reformation according to an equivalence ratio in the fuel reformation cylinder, a concentration of a specific gas component in the reformed fuel generated in the fuel reformation cylinder adjusted towards a target concentration defined according to a required engine power, the gas temperature adjusted based on the target concentration.

2. The control device according to claim 1, wherein:
the fuel reformation cylinder is structured as a reciprocation type in which a piston reciprocates in the cylinder, and
the gas temperature adjustment unit configured to adjust the gas temperature in the fuel reformation cylinder at a timing of the piston reaching a compression top dead point in the fuel reformation cylinder, according to an equivalence ratio in the fuel reformation cylinder.

3. The control device according to claim 1, wherein:
the gas temperature adjustment unit is configured to set the gas temperature in the fuel reformation cylinder at the time of fuel reformation so that the gas temperature is higher for a higher target concentration of hydrogen or carbon monoxide as the specific gas component in the reformed fuel generated in the fuel reformation cylinder.

4. The control device according to claim 2, further comprising
a gas temperature estimation unit configured to estimate the gas temperature in the fuel reformation cylinder at the timing of the piston reaching a compression top dead point, wherein
the gas temperature adjustment unit is configured to adjust the gas temperature according to a deviation between the gas temperature estimated by the gas temperature estimation unit and the gas temperature that achieves the target concentration of the specific gas component in the reformed fuel generated in the fuel reformation cylinder.

5. The control device according to claim 1, wherein:
the gas temperature adjustment unit is configured to adjust the gas temperature in the fuel reformation cylinder at the time of fuel reformation, by adjusting the temperature of taken-in gas introduced to the fuel reformation cylinder.

6. The control device according to claim 1, wherein:
the gas temperature adjustment unit is configured to adjust the gas temperature in the fuel reformation cylinder at the time of fuel reformation, by adjusting an effective compression ratio of the fuel reformation cylinder.

7. The control device according to claim 1, wherein:
the gas temperature adjustment unit is configured to adjust the gas temperature in the fuel reformation cylinder at the time of fuel reformation, by adjusting a concentration of oxygen in taken-in gas introduced to the fuel reformation cylinder.

8. The control device according to claim 1, wherein:
a lower limit value of the temperature in the fuel reformation cylinder is set according to the equivalence ratio in the fuel reformation cylinder, and the lower limit value of the temperature in the fuel reformation cylinder is higher for a higher equivalence ratio in the fuel reformation cylinder.

9. A control method for an internal combustion engine including a fuel reformation cylinder and an output cylinder to which reformed fuel generated in the fuel reforming cylinder is supplied, the output cylinder being configured to yield an engine power by combusting the reformed fuel, the control method comprising:
adjusting a gas temperature of a gas prior to the gas being provided to the fuel reformation cylinder based on an equivalence ratio in the fuel reformation cylinder, a concentration of a specific gas component in the reformed fuel generated in the fuel reformation cylinder adjusted towards a target concentration defined according to a required engine power, the gas temperature adjusted based on the target concentration.

10. The control method according to claim 9, further comprising:
determining the gas temperature in the fuel reformation cylinder;
performing a comparison based on the concentration of the specific gas component in the reformed fuel and the target concentration; and
wherein the concentration of the specific gas component is adjusted to be equal to the target concentration.

11. An apparatus comprising:
a control device configured to initiate, based on a determination that a compression end gas temperature of a fuel reformation cylinder corresponding to a gas component concentration of the fuel reformation cylinder does not equal a target compression end gas temperature of the fuel reformation cylinder corresponding to a target concentration, a gas temperature adjustment process configured to adjust a temperature of a gas prior to the gas being provide to the fuel reformation cylinder such that the gas component concentration is adjusted towards the target concentration.

12. The apparatus according to claim 11, wherein the gas component concentration is based on the compression end gas temperature of the fuel reformation cylinder.

13. The apparatus according to claim 11, wherein the control device comprises a central processing unit or an electronic control unit.

14. The apparatus according to claim 11, wherein the concentration of the gas component is adjusted to be equal to the target concentration.

15. The apparatus according to claim 11, wherein the control device is configured to:
determine the compressing end gas temperature of the fuel reformation cylinder;
perform a comparison based on the compression end gas temperature of the fuel reformation cylinder corresponding to the gas component concentration and the temperature of the target compression end gas temperature of the fuel reformation cylinder corresponding to the target concentration; and
determine that the compressing end gas temperature of the fuel reformation cylinder corresponding to the gas component concentration is greater than or less than the temperature of the target compression end gas temperature of the fuel reformation cylinder corresponding to the target concentration.

16. The apparatus according to claim 11, further comprising:
an EGR cooler configured to:
receive an EGR gas via a first flow path including an output cylinder to the EGR cooler; and
cool the EGR gas received from the output cylinder; and
a valve configured to receive the EGR gas via a second flow path including from the output cylinder to the valve; and
wherein:
the fuel reformation cylinder is configured to receive the EGR gas from the EGR cooler;
the fuel reformation cylinder is configured to receive the EGR gas from the valve; and
the control device is configured to send a signal to the valve to adjust an opening degree of the valve based on the determination that the compression end gas temperature of the fuel reformation cylinder corresponding to the gas component concentration does not equal the temperature of the target compression end gas temperature of the fuel reformation cylinder corresponding to the target concentration.

17. The apparatus according to claim 11, further comprising:
a first valve configured to receive an EGR gas via an EGR cooler and an EGR cooler bypass valve; and
wherein:
the fuel reformation cylinder is configured to receive the EGR gas via the first valve; and
the control device is configured to send a signal to the first valve to adjust an opening degree of the first valve based on the determination that the compression end gas temperature of the fuel reformation cylinder corresponding to the gas component concentration does not equal the temperature of the target compression end gas temperature of the fuel reformation cylinder corresponding to the target concentration.

18. The apparatus according to claim 11, further comprising:
a first valve;
a second valve; and
wherein:
the fuel reformation cylinder is configured to receive the gas via the first valve;
the fuel reformation cylinder is configured to discharge the gas via the second valve; and
the control device is configured to:
send a signal to the first valve to adjust an opening timing and a closing timing of the first valve based on the determination that the compression end gas temperature of the fuel reformation cylinder corresponding to a gas component concentration does not equal the temperature of the target compression end gas temperature of the fuel reformation cylinder corresponding to the target concentration; and
send a signal to the second valve to adjust an opening timing and a closing timing of the second valve based on the determination that the compression end gas temperature of the fuel reformation cylinder corresponding to a gas component concentration does not equal a temperature of the target compression end as temperature of the fuel reformation cylinder corresponding to the target concentration.

19. The control device according to claim 1, wherein the concentration of the specific gas component is adjusted to be equal to the target concentration.

20. The control device according to claim 1, wherein:
the reformed fuel generated in the fuel reformation cylinder includes at least two gas components; and
the concentration of the at least two gas components is adjusted based on the gas temperature adjustment in the fuel reformation cylinder.

* * * * *